United States Patent
Tanaka et al.

(10) Patent No.: US 10,648,815 B2
(45) Date of Patent: May 12, 2020

(54) INFORMATION PROCESSING DEVICE, INFORMATION PROCESSING SYSTEM, AND INFORMATION PROCESSING METHOD

(71) Applicant: SONY CORPORATION, Tokyo (JP)

(72) Inventors: Tomohisa Tanaka, Tokyo (JP); Ken Miyashita, Tokyo (JP); Jun Kimura, Kanagawa (JP); Osamu Ooba, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/102,266

(22) Filed: Aug. 13, 2018

(65) Prior Publication Data

US 2018/0347987 A1     Dec. 6, 2018

Related U.S. Application Data

(63) Continuation of application No. 14/771,874, filed as application No. PCT/JP2014/054924 on Feb. 27, 2014, now Pat. No. 10,215,567.

(30) Foreign Application Priority Data

Mar. 21, 2013    (JP) ................................ 2013-058857

(51) Int. Cl.
     *G01C 21/00*      (2006.01)
     *G01C 22/00*      (2006.01)
     (Continued)

(52) U.S. Cl.
     CPC ............. *G01C 21/00* (2013.01); *G01C 21/20* (2013.01); *G01C 21/30* (2013.01); *G01C 22/006* (2013.01)

(58) Field of Classification Search
     CPC ........ G01C 21/00; G01C 21/20; G01C 21/30; G01C 22/006
(Continued)

(56) References Cited

U.S. PATENT DOCUMENTS 8,204,680 B1 * 6/2012 Dorum ............... G01C 21/3697
                                                   340/995.1
8,478,333 B2    7/2013   Kato
(Continued)

FOREIGN PATENT DOCUMENTS

AU      2008316522 A1    4/2009
AU      2008316523 A1    4/2009
(Continued)

OTHER PUBLICATIONS

Machine English Translation JP 2003/051093 (Year: 2003).*
(Continued)

*Primary Examiner* — Dzung Tran
(74) *Attorney, Agent, or Firm* — Chip Law Group

(57) ABSTRACT

There is provided an information processing device including a movement data acquiring unit that acquires pieces of movement data including positional information for movement and time at which the positional information is acquired, a movement data analyzing unit that analyzes a velocity for movement on a specific route on the basis of the pieces of movement data, and a route dividing unit that divides the specific route on the basis of a result obtained by analyzing the velocity.

11 Claims, 25 Drawing Sheets

(51) Int. Cl.
*G01C 21/20* (2006.01)
*G01C 21/30* (2006.01)

(58) Field of Classification Search
USPC .......................................................... 702/142
See application file for complete search history.

(56) References Cited

U.S. PATENT DOCUMENTS

| | | | |
|---|---|---|---|
| 9,235,339 | B2 | 1/2016 | Terai |
| 9,301,099 | B2 | 3/2016 | Witmer |
| 9,677,887 | B2 | 6/2017 | Werner et al. |
| 2006/0143645 | A1* | 6/2006 | Vock .................. A43B 3/00 725/9 |
| 2009/0018996 | A1 | 1/2009 | Hunt et al. |
| 2010/0250127 | A1* | 9/2010 | Hilbrandie ............ G01C 21/32 701/533 |
| 2010/0286907 | A1 | 11/2010 | Hilbrandie et al. |
| 2010/0299055 | A1 | 11/2010 | Hilbrandie et al. |
| 2010/0299064 | A1 | 11/2010 | Hilbrandie et al. |
| 2010/0312472 | A1 | 12/2010 | Hilbrandie et al. |
| 2011/0160996 | A1* | 6/2011 | Terai ................. G01C 21/3423 701/532 |
| 2012/0016584 | A1 | 1/2012 | Nakashima |
| 2012/0315928 | A1* | 12/2012 | Hashimoto ............ G01C 21/28 455/456.6 |
| 2013/0142495 | A1 | 6/2013 | Terai |
| 2015/0189476 | A1 | 7/2015 | Tanaka |
| 2015/0285656 | A1 | 10/2015 | Verheyen et al. |
| 2016/0286360 | A1 | 9/2016 | Miller et al. |

FOREIGN PATENT DOCUMENTS

| | | |
|---|---|---|
| AU | 2008316525 A1 | 4/2009 |
| AU | 2008316527 A1 | 4/2009 |
| AU | 2008316529 A1 | 4/2009 |
| AU | 2008316530 A1 | 4/2009 |
| CA | 2703502 A1 | 4/2009 |
| CA | 2703503 A1 | 4/2009 |
| CA | 2703505 A1 | 4/2009 |
| CA | 2703507 A1 | 4/2009 |
| CA | 2703510 A1 | 4/2009 |
| CA | 2703515 A1 | 4/2009 |
| CN | 101836079 A | 9/2010 |
| CN | 101836080 A | 9/2010 |
| CN | 101836081 A | 9/2010 |
| CN | 101836082 A | 9/2010 |
| CN | 101836083 A | 9/2010 |
| CN | 101836084 A | 9/2010 |
| EP | 2203713 A1 | 7/2010 |
| EP | 2203714 A1 | 7/2010 |
| EP | 2203715 A1 | 7/2010 |
| EP | 2203716 A1 | 7/2010 |
| EP | 2203717 A1 | 7/2010 |
| EP | 2203718 A1 | 7/2010 |
| EP | 2573519 A1 | 3/2013 |
| ES | 2386394 T3 | 8/2012 |
| JP | 2003-051093 A | 2/2003 |
| JP | 2006-141867 A | 6/2006 |
| JP | 2010-197344 A | 9/2010 |
| JP | 2011-502299 A | 1/2011 |
| RU | 2010121136 A | 12/2011 |
| RU | 2010121147 A | 12/2011 |
| RU | 2010121151 A | 12/2011 |
| RU | 2010121152 A | 12/2011 |
| RU | 2010121277 A | 12/2011 |
| TW | 200925554 A | 6/2009 |
| TW | 200925556 A | 6/2009 |
| TW | 200925557 A | 6/2009 |
| TW | 200925631 A | 6/2009 |
| TW | 200928308 A | 7/2009 |
| TW | 200928312 A | 7/2009 |
| WO | 2009/053405 A1 | 4/2009 |
| WO | 2009/053406 A1 | 4/2009 |
| WO | 2009/053407 A1 | 4/2009 |
| WO | 2009/053408 A1 | 4/2009 |
| WO | 2009/053410 A1 | 4/2009 |
| WO | 2009/053411 A1 | 4/2009 |

OTHER PUBLICATIONS

Machine English Translation JP 2006/141867 (Year: 2006).*
Office Action for CN Patent Application No. 201480015009.8, dated May 18, 2017, 7 pages of Office Action and 12 pages of English Translation.
Notice of Allowance and Fees Due for U.S. Appl. No. 14/771,874, dated May 4, 2018, 10 pages.
Notice of Allowance and Fees Due for U.S. Appl. No. 14/771,874, dated Jan. 12, 2018, 5 pages.
Non-Final Rejection for U.S. Appl. No. 14/771,874, dated Aug. 16, 2017, 13 pages.
International Search Report and Written Opinion of PCT Application No. PCT/JP2014/054924, dated May 13, 2014, 9 pages of English Translation and 9 pages of ISRWO.
International Preliminary Report on Patentability of PCT Application No. PCT /JP2014/054924, dated Sep. 22, 2015, 8 pages of English Translation and 5 pages of IPRP.

* cited by examiner

FIG. 3

| TIME | (LATITUDE, LONGITUDE) |
|---|---|
| TIME 1 | (LATITUDE 1, LONGITUDE 1) |
| TIME 2 | (LATITUDE 2, LONGITUDE 2) |
| ⋮ | ⋮ |

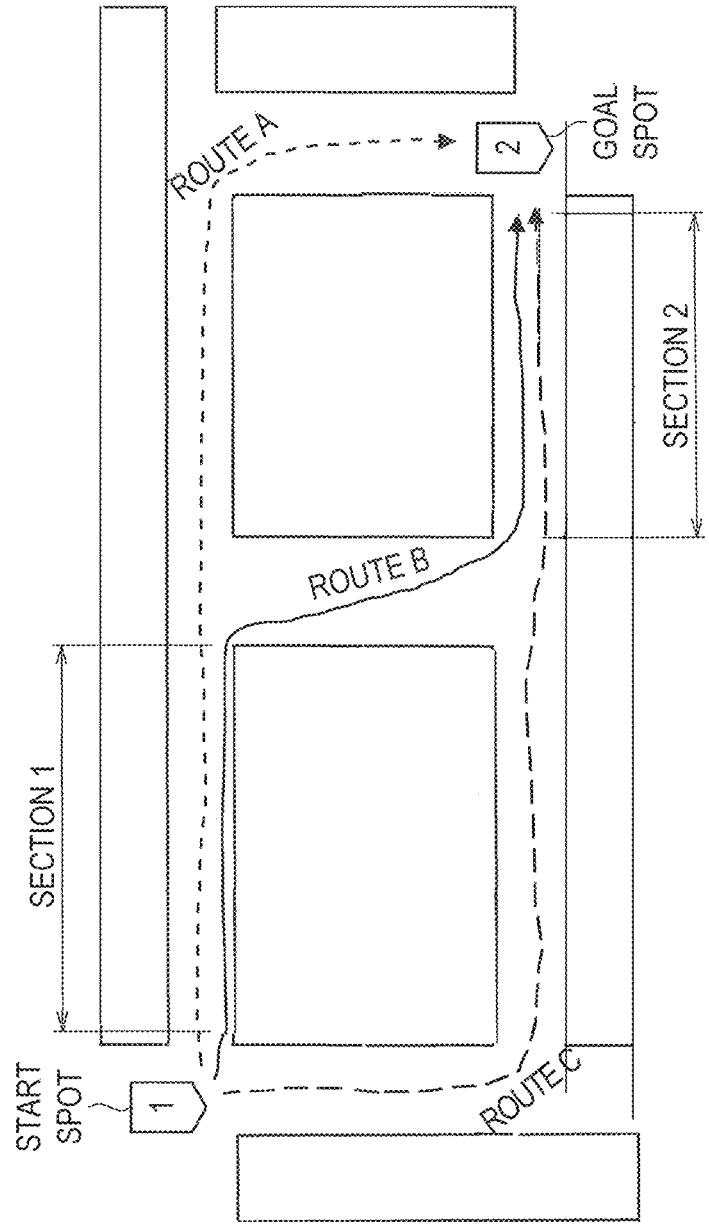

EXAMPLE OF DATA STORED IN DATABASE A

EXPRESS VICINITY OF COORDINATES p(k) IN CHAIN LINE

EXTRACT DATA OF NORMALIZED VELOCITY u(k) HAVING SAME DIRECTION IN VICINITY OF COORDINATES p(k)

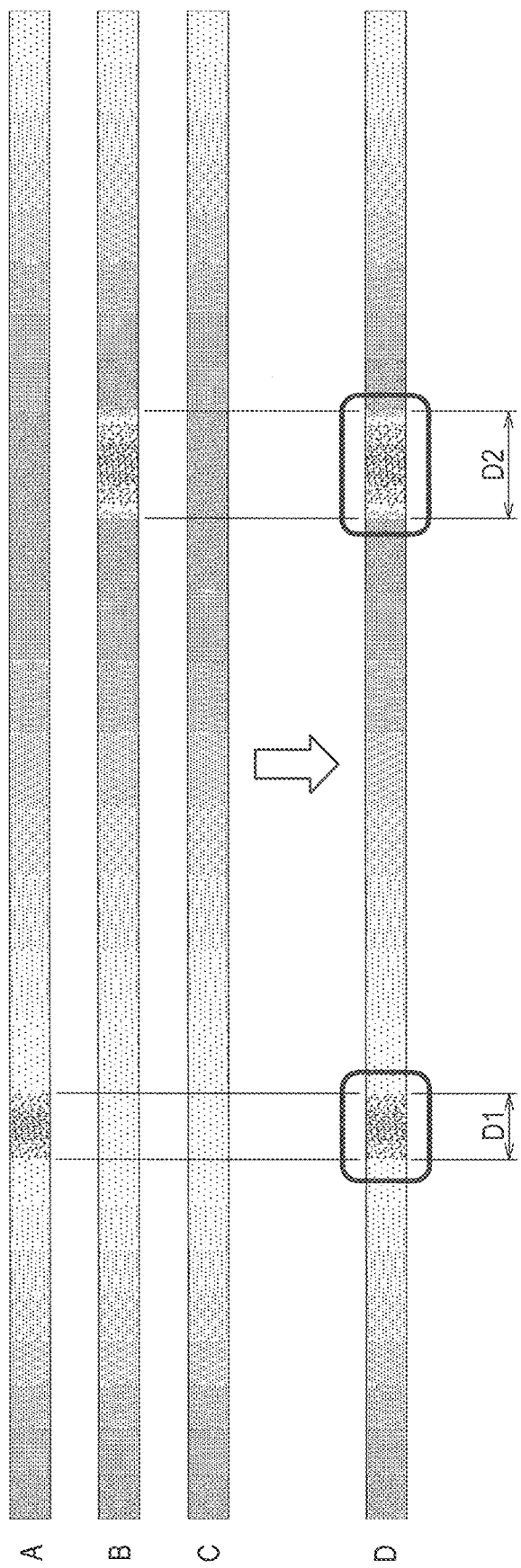

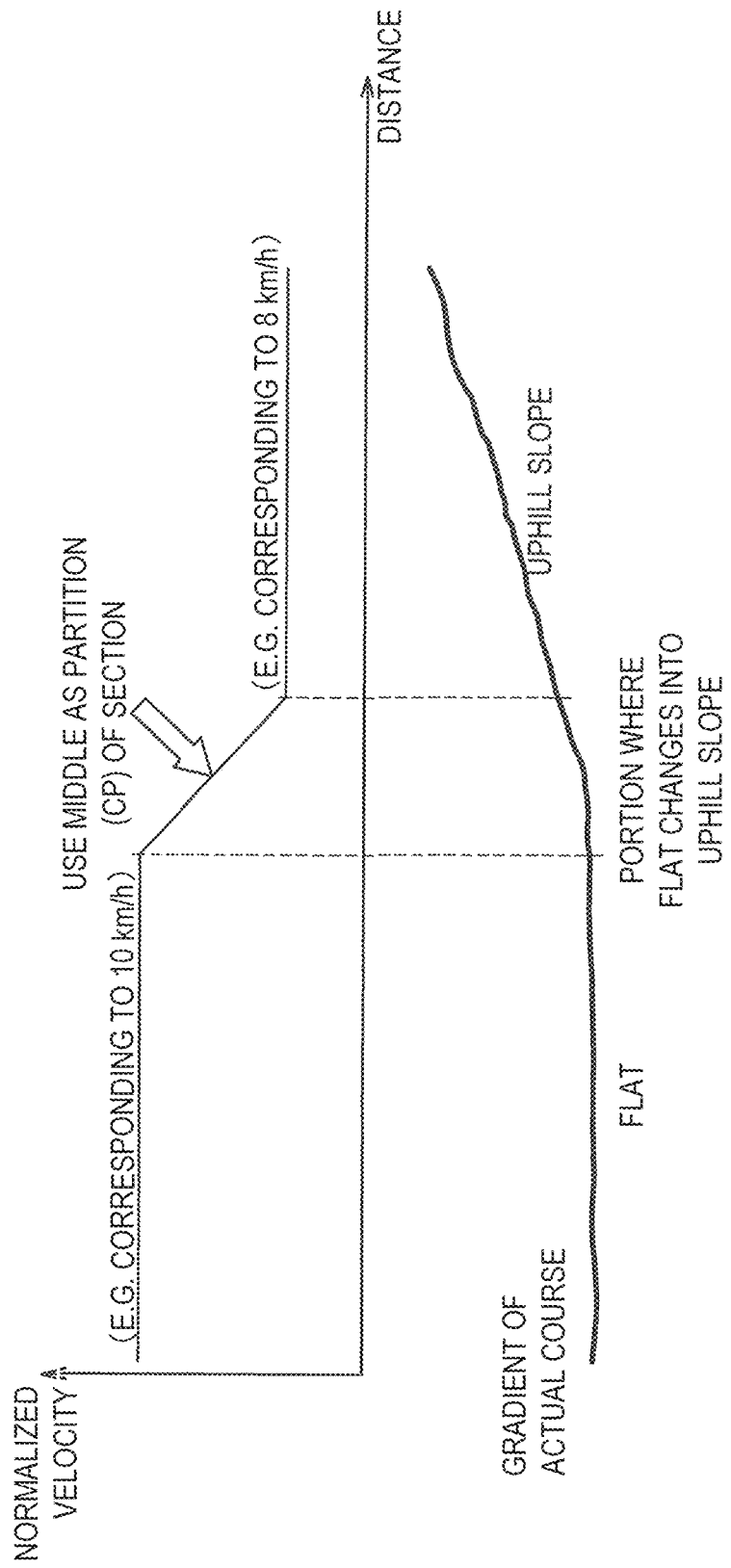

INFORMATION PROCESSING DEVICE, INFORMATION PROCESSING SYSTEM, AND INFORMATION PROCESSING METHOD

CROSS-REFERENCE TO RELATED APPLICATIONS

The present application is a continuation application of U.S. patent application Ser. No. 14/771,874, filed Sep. 1, 2015, which is a National Stage Entry of PCT/JP2014/054924, filed Feb. 27, 2014, and claims the benefit of priority from prior Japanese Patent Application 2013-058857 filed in the Japan Patent Office on Mar. 21, 2013, the entire contents of which are hereby incorporated by reference.

TECHNICAL FIELD

The present disclosure relates to an information processing device, an information processing system, and an information processing method.

BACKGROUND ART

For example, Patent Literature 1 conventionally describes that if split time or the like at a point spot that a user arbitrarily selects is stored in advance, and the user or another user runs on the same route, split time or the like is, for example, automatically acquired at that point spot. Patent Literature 1 further describes a technique of providing effective advice for a next run on the basis of the present split time or the like and the past split time or the like stored in advance.

CITATION LIST

Patent Literature

Patent Literature 1: JP 2010-197344A

SUMMARY OF INVENTION

Technical Problem

Setting check points at predetermined intervals as described in Patent Literature above, however, means setting check points irrespective of the situation of a movement route, so that it is not possible to set a check point at a position meaningful for a user. Although a user can set a check point at that spot by pressing a button while the user is running, it is not possible to overlook the whole course after running and edit the place of the check point.

The technique described in Patent Literature above is for setting a check point during running, and furthermore, setting a check point is dependent on information on a running history of a single user. Accordingly, it is difficult to set a useful check point on a route by using even a running history of another user.

It is thus desired to set a check point at the optimum position on a given route set by a user in terms of the situation of a running path or the like.

Solution to Problem

According to the present disclosure, there is provided an information processing device including: a movement data acquiring unit configured to acquire pieces of movement data including positional information for movement and time at which the positional information is acquired; a movement data analyzing unit configured to analyze a velocity for movement on a specific route on the basis of the pieces of movement data; and a route dividing unit configured to divide the specific route on the basis of a result obtained by analyzing the velocity.

In addition, the information processing device may further include: a check point setting unit configured to set a check point for measuring time on the divided specific route.

In addition, the movement data analyzing unit may analyze the velocity for the movement on the specific route for each of the pieces of movement data on the basis of a result obtained by analyzing a plurality of normalized velocities obtained by dividing each of velocities acquired at a plurality of positions by velocities in all of sections.

In addition, the movement data analyzing unit may analyze a velocity for movement at a given position on the specific route on the basis of the normalized velocity acquired at a position adjacent to the given position on the specific route.

In addition, the movement data analyzing unit may analyze a velocity for movement at a given position on the specific route on the basis of the normalized velocity having a same direction as a direction of a velocity at the given position on the specific route.

In addition, the route dividing unit may divide the specific route on the basis of a change in the velocity for the movement at the given position on the specific route. The check point setting unit may set the check point in each of sections obtained through division.

In addition, the route dividing unit may divide the specific route on the basis of a movement average of the velocity for the movement at the given position on the specific route. The check point setting unit may set the check point in each of sections obtained through division.

In addition, the check point setting unit may set the check point at an intermediate position of each of the sections obtained through the division.

In addition, the check point setting unit may select one or more sections each having a movement average considerably changing from each of the sections obtained through the division, and may set the check point in the each of the selected sections.

Furthermore, according to the present disclosure, there is provided an information processing device including: a positional information acquiring unit configured to acquire positional information for movement; a transmission unit configured to transmit movement data to a server, the movement data including the positional information and time at which the positional information is acquired; and a reception unit configured to receive information relating to a check point set on a route of the movement data. The information relating to the check point is set by the server analyzing a velocity for movement on the route of the movement data on the basis of pieces of the movement data received from a different device.

Furthermore, according to the present disclosure, there is provided an information processing system including: an information processing device including a movement data acquiring unit configured to acquire pieces of movement data including positional information for movement and time at which the positional information is acquired, a movement data analyzing unit configured to analyze a velocity for movement on a specific route on the basis of the pieces of movement data, a route dividing unit configured to divide the specific route on the basis of a result obtained by analyzing the velocity; a check point setting unit configured to set a check point for measuring time on the divided specific route, and a transmission unit configured to transmit information on the check point; and a mobile device including a positional information acquiring unit configured to acquire positional information for movement, a transmission unit configured to transmit movement data to the information processing device, the movement data including the positional information and time at which the positional information is acquired, and a reception unit configured to receive the information on the check point transmitted by the information processing device.

Furthermore, according to the present disclosure, there is provided an information processing method including: acquiring pieces of movement data including positional information for movement and time at which the positional information is acquired; analyzing a velocity for movement on a specific route on the basis of the pieces of movement data; and dividing the specific route on the basis of a result obtained by analyzing the velocity.

Furthermore, according to the present disclosure, there is provided an information processing method including: acquiring positional information for movement; transmitting movement data to a server, the movement data including the positional information and time at which the positional information is acquired; and receiving information relating to a check point set on a route of the movement data. The information relating to the check point is set by the server analyzing a velocity for movement on the route of the movement data on the basis of pieces of the movement data received from a different device.

Advantageous Effects of Invention

According to the present disclosure, it is possible to set a check point at the optimum position on a given route set by a user in terms of the situation of a running path or the like.

BRIEF DESCRIPTION OF DRAWINGS

FIG. 3 is a schematic diagram illustrating a piece of run data.

FIG. 13 is a schematic diagram for describing an overview of an automatic check point disposing function.

FIG. 25 is a schematic diagram illustrating a technique of estimating a position of a traffic light on the basis of a result obtained by analyzing a piece of run data.

FIG. 26 is a schematic diagram illustrating an example in which a check point is set if a section 1 is a flat and a section 2 is an uphill slope.

DESCRIPTION OF EMBODIMENTS

Hereinafter, preferred embodiments of the present disclosure will be described in detail with reference to the appended drawings. Note that, in the present description and the drawings, elements that have substantially the same function and structure are denoted with the same reference signs, and repeated explanation is omitted.

The description will be now made in the following order.
1. Example of Entire Configuration of System
2. Overview of Process Performed in System
3. Automatic Check Point Disposing Function
4. Specific Example of Process Performed in Server
5. Example of Configuration of System according to Present Embodiment
6. Example of Setting Check Point Based on Already Set Check Point

[1. Example of Entire Configuration of System]

Figure 1:
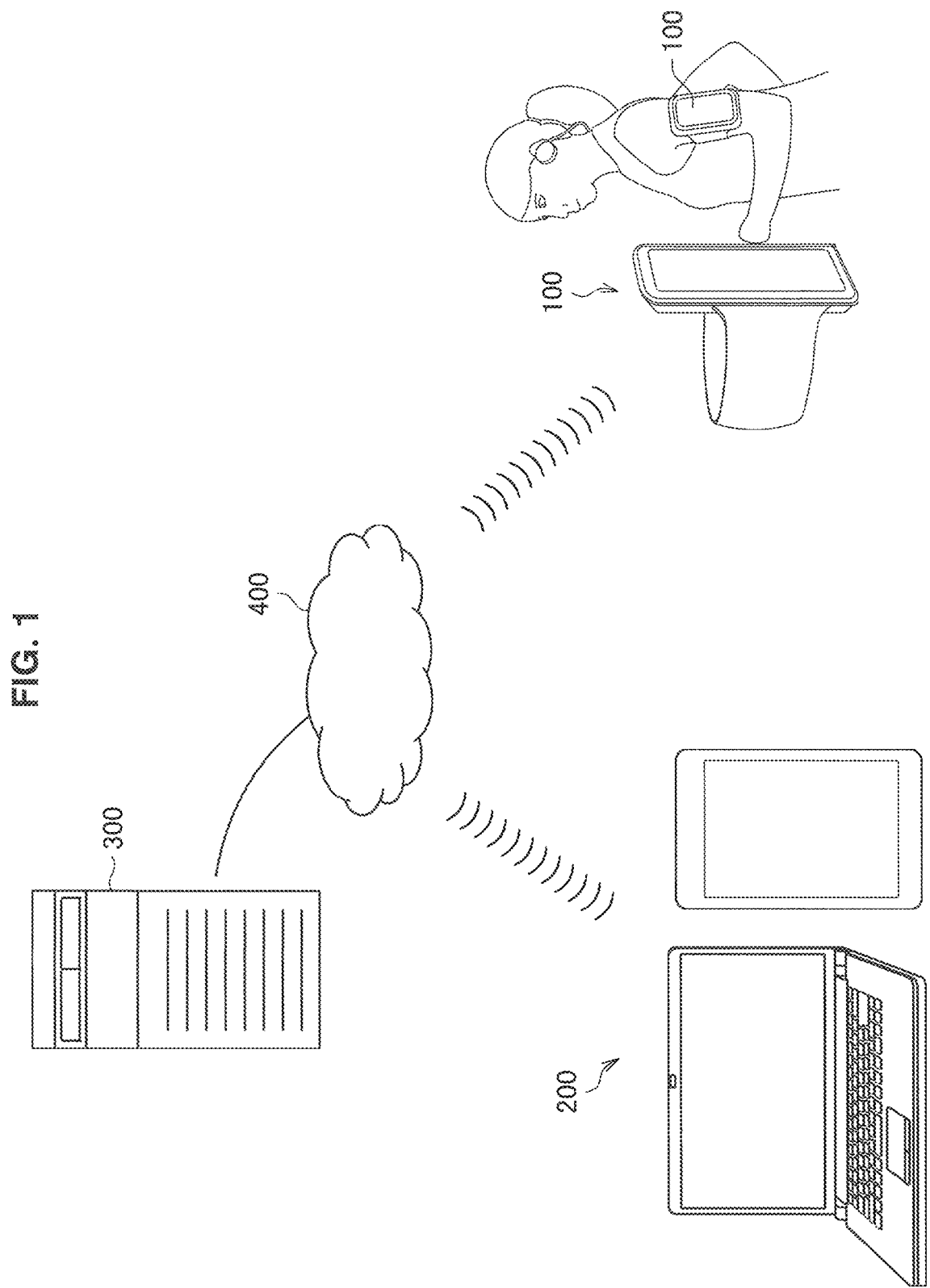
FIG. 1 is a schematic diagram illustrating a schematic configuration of a system according an embodiment of the present disclosure.

First, a schematic configuration of a system according to an embodiment of the present disclosure will be described with reference to FIG. 1. As illustrated in FIG. 1, the system according to the present embodiment includes a mobile terminal 100 that measures a piece of run data of a running user and provides an instruction, a personal computer (PC) 200 used for creating a race course from the piece of run data and map information, and a cloud server 300 that manages pieces of run data, race records, and the like of a plurality of users. Additionally, the PC 200 may also be a device such as a tablet terminal.

The mobile terminal 100 is a smartphone that can be fixed on an arm with an arm band or the like as an example. A user runs with the mobile terminal 100 worn on his or her arm, thereby allowing the mobile terminal 100 to acquire positional information corresponding to a running route and the time corresponding to the positional information. The mobile terminal 100 has a function of a user interface (UI) such as a liquid crystal display device (LCD) and a touch panel, a GPS function, a sound (audio) output function and a function for connecting to a network 400, and can communicate with the server 300 via the network 400 such as the Internet 400. The use of the UI function of the mobile terminal 100 allows a user to operate a touch panel and to point displayed content on a screen of the liquid crystal display device watching the screen. The mobile terminal 100 stores account information (user ID and password) on a specific user that can be recognized by the server 300.

An information processing device 200 has a function of an UI such as a liquid crystal display device (LCD) and a mouse or touch panel. The use of the UI function of the information processing device 200 allows a user to point displayed content on a screen of an LCD with a mouse or a touch panel watching the screen. The information processing device 200 can communicate with the server 300 via the network 400. The information processing device 200 can edit and set a race course by displaying a map and a course for which a piece of run data has been measured on a display screen of the liquid crystal display device (LCD) and setting a check point.

The server 300 provides a database and a function of accessing the database. The database receives a piece of data such as user information, a piece of run data of a user, information on a course and race created by a user and a race record from the mobile terminal 100 and the information processing device 200, and permanently records the piece of data. In addition, the server 300 transmits the piece of data in response to an inquiry from these devices.

[2. Overview of Process Performed in System]

Figure 2:
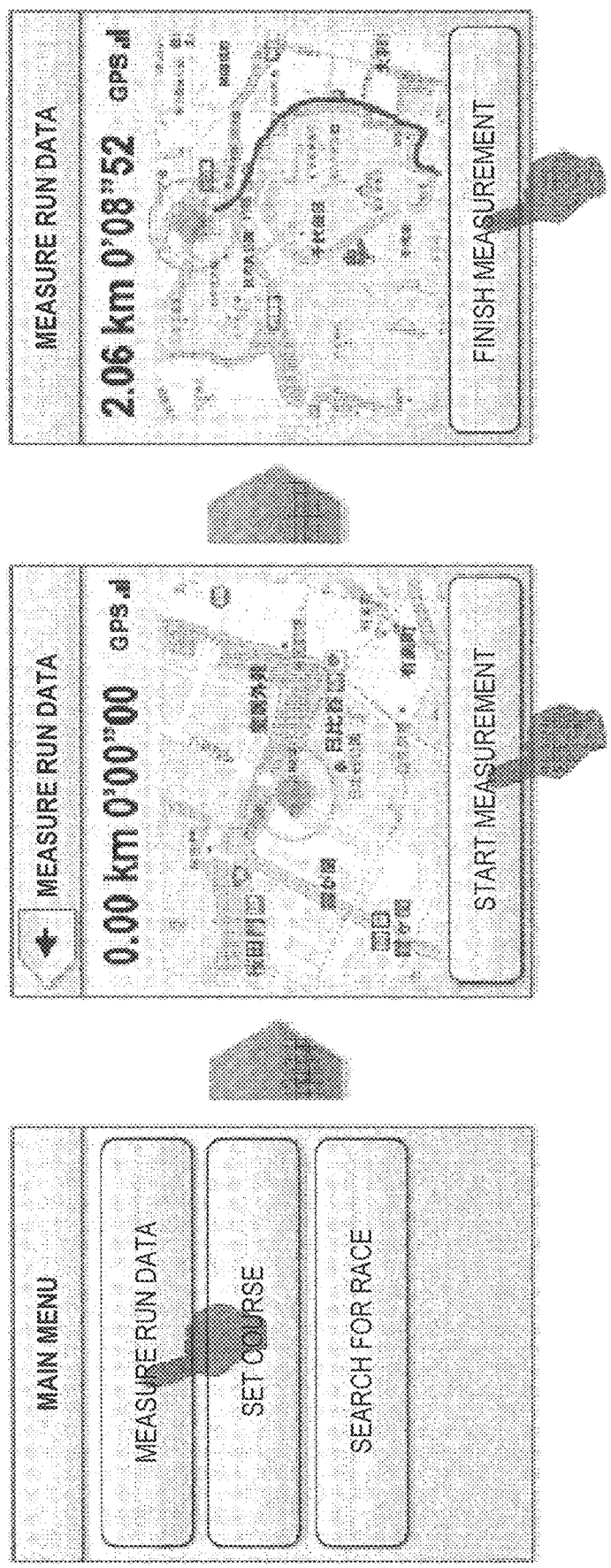
FIG. 2 is a schematic diagram illustrating a transition of a display screen of an LCD of a mobile terminal.

Next, the acquisition of a piece of run data will be described. A user wears the mobile terminal 100 and runs. In the following description, FIGS. 2, and 4 to 12 each illustrate a transition of a display screen of an LCD of the mobile terminal 100. As illustrated in FIG. 2, a user presses a "measure run data" button→a "start measurement" button on the UI of the mobile terminal 100 before running, and starts to run. While a user is running, the mobile terminal 100 measures the positions at predetermined time intervals with the GPS to acquire a piece of run data.

As illustrated in FIG. 3, the piece of run data is an array of pieces of data having a pair of time and a position. The UI of the mobile terminal 100 displays a piece of run data on a map as a "locus (running locus) from the start of running to the present position" during running. The distance and time of the running locus from the measurement start spot (start point) to the present position are further displayed. When the present position is displayed on a map, the signal strength of a GPS is also displayed. A user can finish running by pressing a "finish measurement" button on the UI of the mobile terminal 100 whenever the user is running. Once running is finished, the mobile terminal 100 uploads and stores the measured piece of run data to and in the server 300 in association with the user ID.

Next, course setting and the release of a race will be described. A user can edit a race course and release the race course to another user by logging in to the server 300, displaying a map and a course for which a piece of run data has been measured, and setting a check point on the course with the information processing device 200 (the mobile terminal 100 used for acquiring a piece of run data may also be used).

Figure 4:
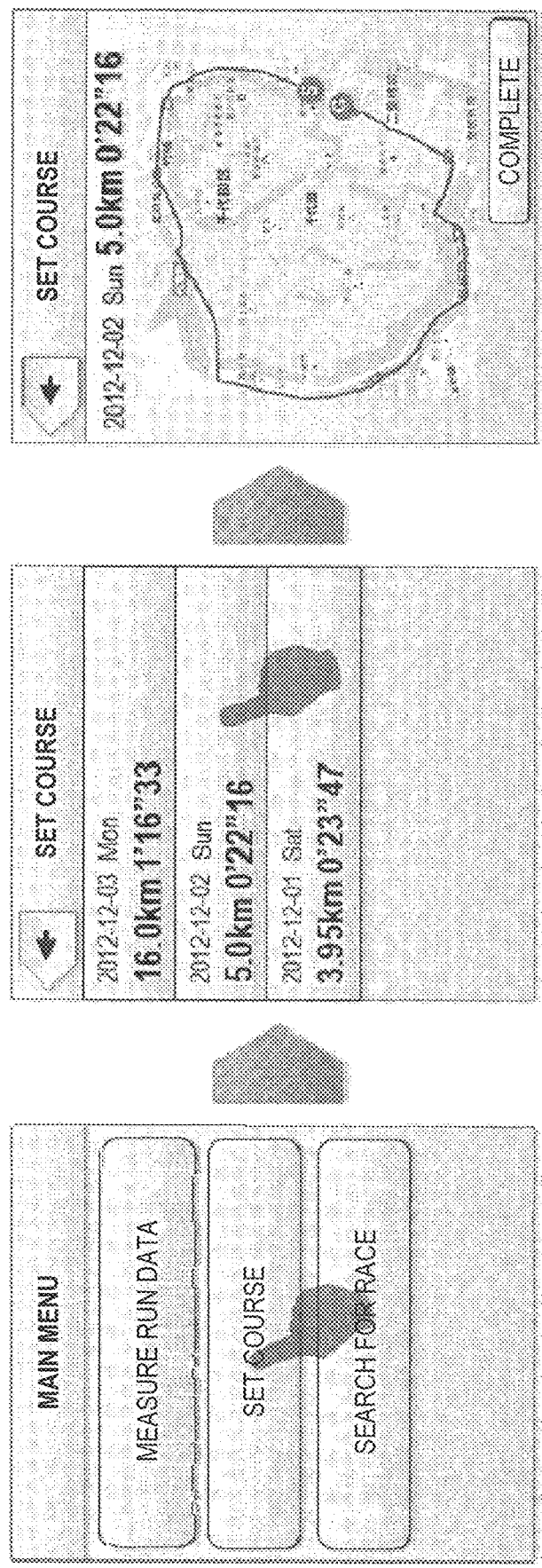
FIG. 4 is a schematic diagram illustrating a transition of a display screen of an LCD of a mobile terminal.

As illustrated in FIG. 4, a user presses a "set course" button on the UI of the information processing device 200, and selects a piece of run data from a list of pieces of run data that are stored in the server 300 and measured when the user himself or herself ran. A running date and time, a running distance, running time, and the like are displayed as elements of the list of pieces of run data. Once a user decides a piece of run data, the information processing device 200 displays the map corresponding to the piece of run data and further overlays a running locus on the map. An icon of a start point (S) and an icon of a goal point (G) are displayed at the start spot and the goal spot of a piece of run data, respectively. A "complete" button is further displayed which is pressed when check point setting is finished as discussed below.

Specifically, the server 300 provides an API for returning a list of pieces of run data IDs associated with user IDs. In addition, the server 300 provides an API for acquiring, from a run data ID, its run data, its running distance and metadata such as a date and time. The information processing device 200 uses these APIs to acquire a piece of data necessary for the display.

Figure 5:
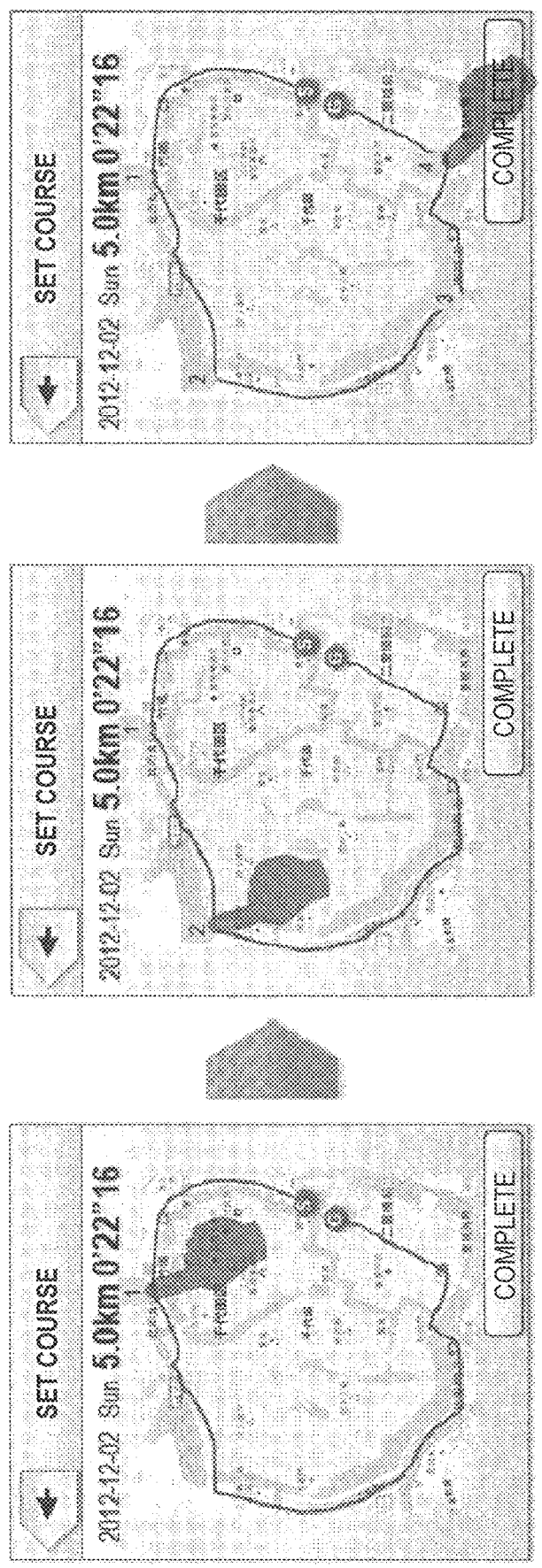
FIG. 5 is a schematic diagram illustrating a transition of a display screen of an LCD of a mobile terminal.

As illustrated in FIG. 5, a user sets a check point on a course by disposing and editing the icon of a check point on this display. A user can dispose a check point by tapping on the running locus. It is not possible to dispose a check point on a portion other than the locus of a piece of run data. It is then possible to initially dispose a checkpoint with an automatic check point disposing function discussed below, and to manually move, add, or delete a check point thereafter. A check point may also be disposed in a manual fashion alone without the automatic check point disposing function. The disposed check points are numbered in an increasing distance order from the start point on the locus. If N check points are set, the individual check points are expressed as CP # k (k=1, 2, . . . , N) in an increasing distance order from the start point. In addition, a section between the start point and CP #1 is expressed as a first section of the course, a section between CP #1 and CP #2 is expressed as a second section, and so on. The final section is a (N+1)-th section.

Figure 6:
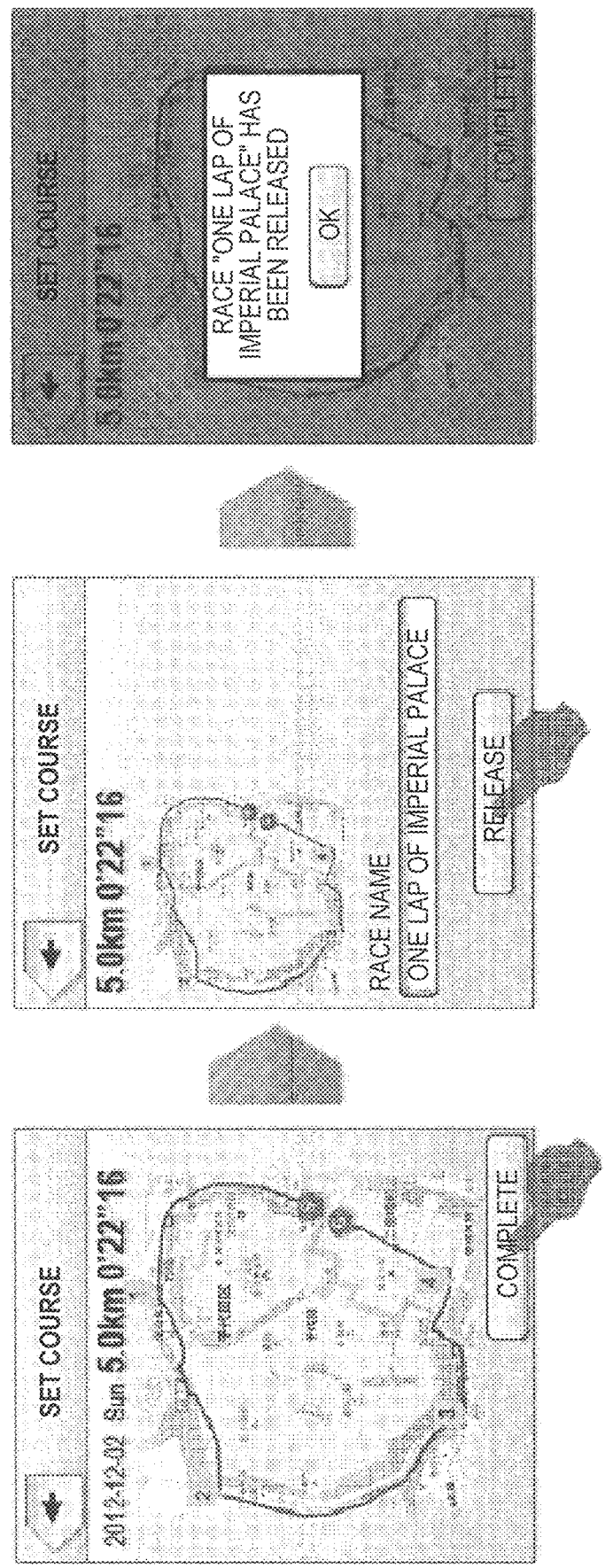
FIG. 6 is a schematic diagram illustrating a transition of a display screen of an LCD of a mobile terminal.

As illustrated in FIG. 6, once a user presses the "complete" button on the UI, check point setting is finished. The user further enters the race name of the created course, and presses a "release" button. The run data ID, the set check point, and the race name are uploaded to the server 300 and stored. The information processing device 200 notifies the user through the UI (such as a dialogue) that the creation and release of a new race results in success. The server 300 allows a user other than the course creator to refer to the released race.

Specifically, the server 300 provides a new race creation API. Designating a run data ID, a race name, and an array of the coordinates of a check point creates a new race ID. The individual races have metadata of course records shared by all the users, and the personal best records of users who have participated in the races.

The course record is metadata decided from the piece of run data having the shortest running time for the whole course and each section and is decided with a related run data ID, and the time and distance of running and a user name are shown on the UI. The run data ID of the piece of run data used by the course creator for setting a course is set as the initial value (time necessary for the whole course and each section) of the course record.

The personal best record is metadata decided from the piece of run data having the shortest running time for the whole course and each section and is decided in the same way with a related run data ID, and the time and distance of running are shown on the UI. The run data ID of the piece of run data used by the course creator for setting a course is set as the initial value (time necessary for the whole course and each section) of the personal best record decided with the race ID and the user ID of the course creator.

Figure 7:
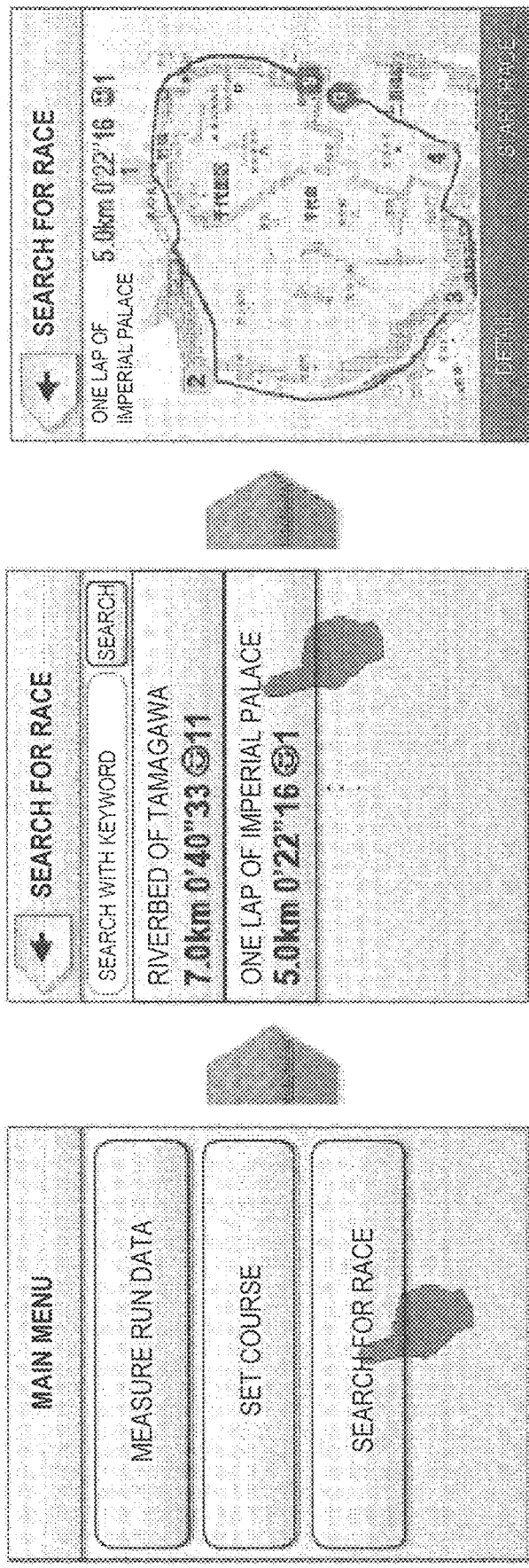
FIG. 7 is a schematic diagram illustrating a transition of a display screen of an LCD of a mobile terminal.

Next, search for a race through the network 400 will be described. As illustrated in FIG. 7, a user presses a "search for a race" button on the UI of the mobile terminal 100, and displays a list of released races. A race name, the time and distance of a course record, and the number of participating users are displayed for each race that is an element in the list. Once a race is selected, information on the race is displayed. The start point and goal point of the course, all the check points, and the running locus of the piece of run data of the course record are overlaid on a map as the information on a race in addition to the race name, the time and distance of the course record, and the number of participating users. A "detail" button for displaying detailed information on the race, and a "start race" button for starting the race are also displayed.

Figure 8:
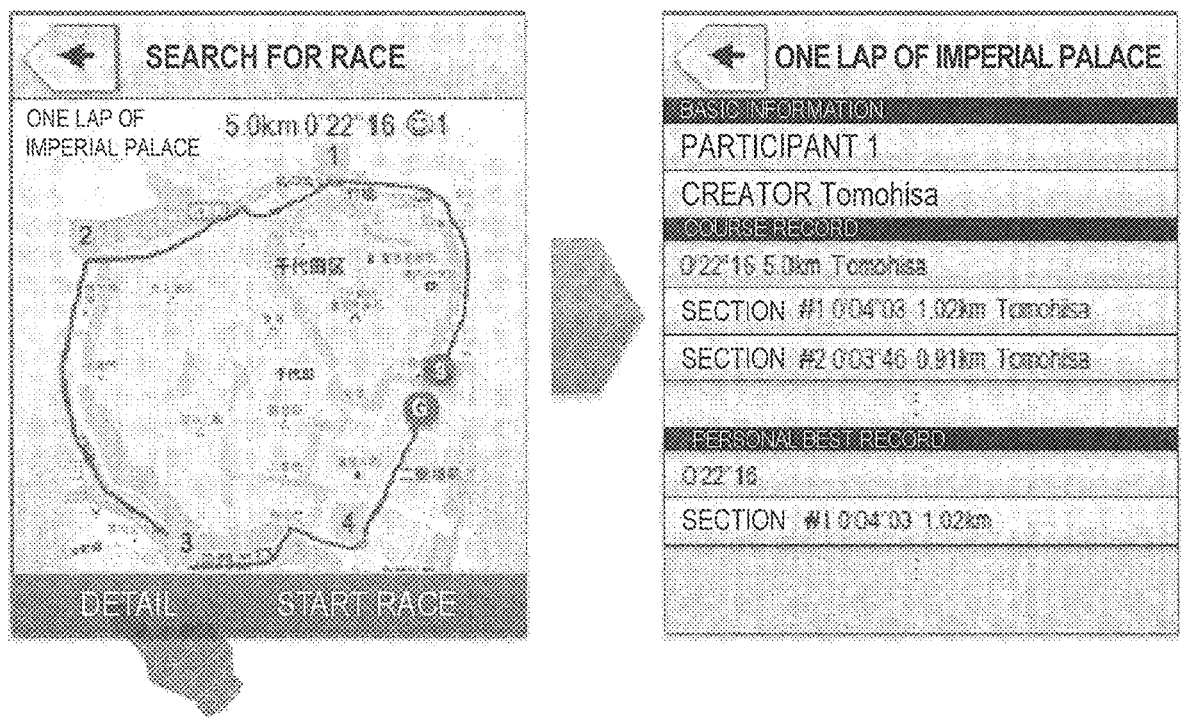
FIG. 8 is a schematic diagram illustrating a transition of a display screen of an LCD of a mobile terminal.

If a user presses the "detail" button with information on a race displayed on the mobile terminal 100 in FIG. 7, basic information (the number of participating users and the course creator) relating to the race, the course record, and the personal best record are displayed as illustrated in FIG. 8. However, if a user has not yet run the whole course, the personal best record is not displayed.

Specifically, the server 300 provides an API for acquiring a list of race IDs. The server 300 provides an API for acquiring the race name, the number of participating users, the course creator, the coordinates of a start point, the coordinates of a goal point, an array of the coordinates of a check point, and the course record from a race ID. The server 300 also provides an API for acquiring, from a race ID and a user ID, the personal best record of the user in the race. The use of these API executes the process.

Figure 9:
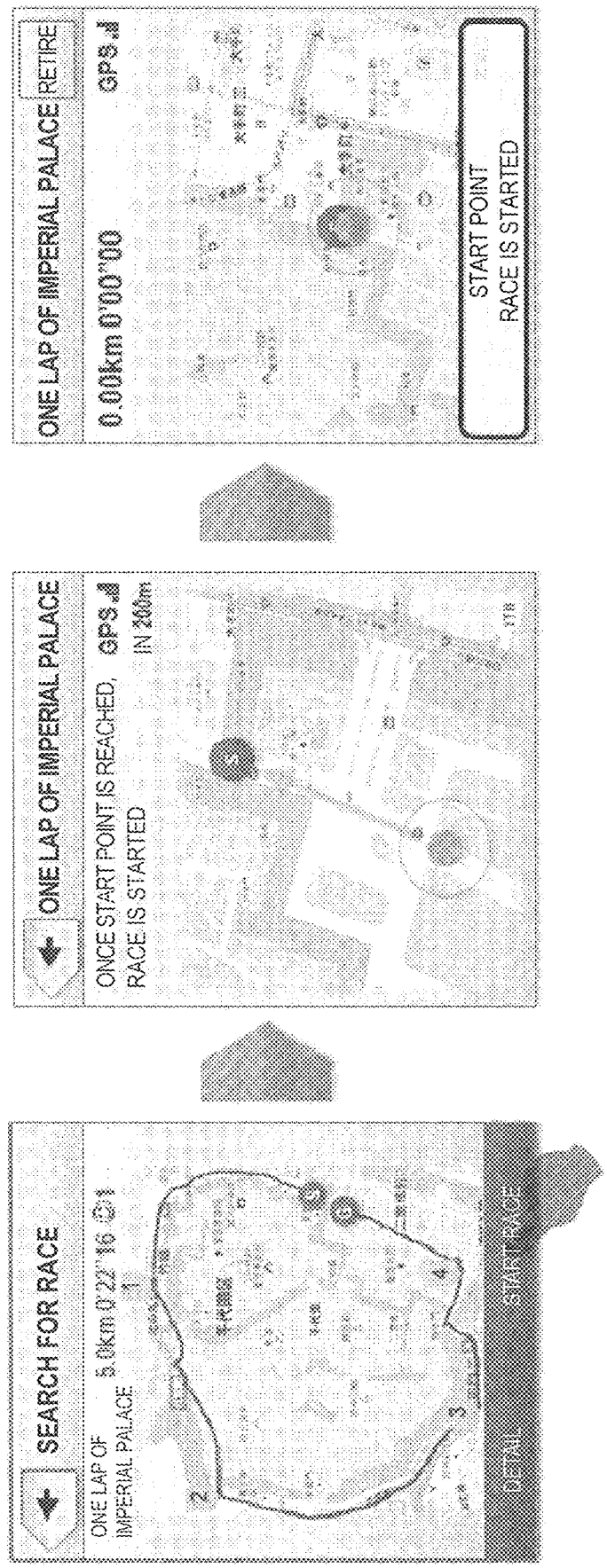
FIG. 9 is a schematic diagram illustrating a transition of a display screen of an LCD of a mobile terminal.

Next, the start and end of a race will be described. If a user presses the "start race" button with information on a race displayed on the mobile terminal 100 in FIG. 7, a standby screen for starting a race is displayed as illustrated in FIG. 9. A user wears the mobile terminal 100 and runs. The mobile terminal 100 displays the start point of a race and the present position on a map, and displays a guide indicating "that the race is started at the same time as the start point is reached." The guide is not only displayed, but also provided as audio guidance (the same applies hereafter). In addition, the distance to the start point in a straight line and the signal strength of the GPS are displayed. A user moves to the start point, following the guide.

Figure 10:
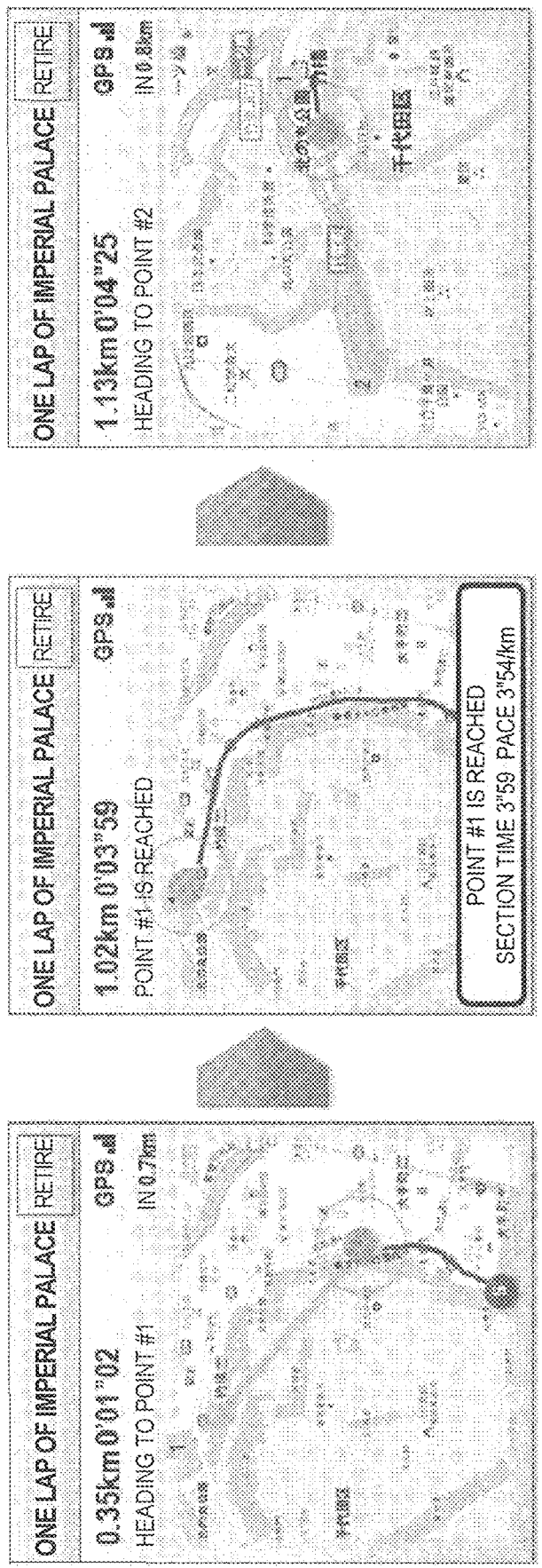
FIG. 10 is a schematic diagram illustrating a transition of a display screen of an LCD of a mobile terminal.

Once the present position of the mobile terminal 100 arrives at the start point, the race is started. Here, the arrival of the present position at a certain spot means that the spot is included within a radius of r meters from the present position. r is a threshold and decided depending on the accuracy of the GPS. Once the present position of the mobile terminal 100 arrives at the start point, the mobile terminal 100 displays a guide indicating "that the race has been started because the start point is reached" as illustrated in FIG. 9. As illustrated in FIG. 10, the mobile terminal 100 consecutively updates and displays the distance of running and the elapsed time during the race. A "retire" button for dropping out of a race is displayed.

As illustrated in FIG. 10, the mobile terminal 100 measures the position with the GPS at predetermined time intervals during the race to acquire a piece of run data. The mobile terminal 100 displays a destination point of a section (a goal point for the final section, or a check point for other sections) in which a user is currently running and the distance to that point in a straight line. However, if the present position arrives at a destination of a section other than the final section, a guide is displayed for a predetermined time for indicating "that the present position arrives at the destination of that section is reached" and indicating "the running time and running pace in that section." Thereafter, the display is updated into the display for the next section. Furthermore, the distance and time of the running locus from the start point to the present position is displayed. In addition, when the present position is displayed on a map, the signal strength of a GPS is also displayed.

If the present position arrives at a destination of a user section and "the running time and running pace of that section" in the guide display of the mobile terminal 100 shows that the running time tops the course record or the personal best record, it may be indicated through guide display (and audio guidance) in addition.

Figure 11:
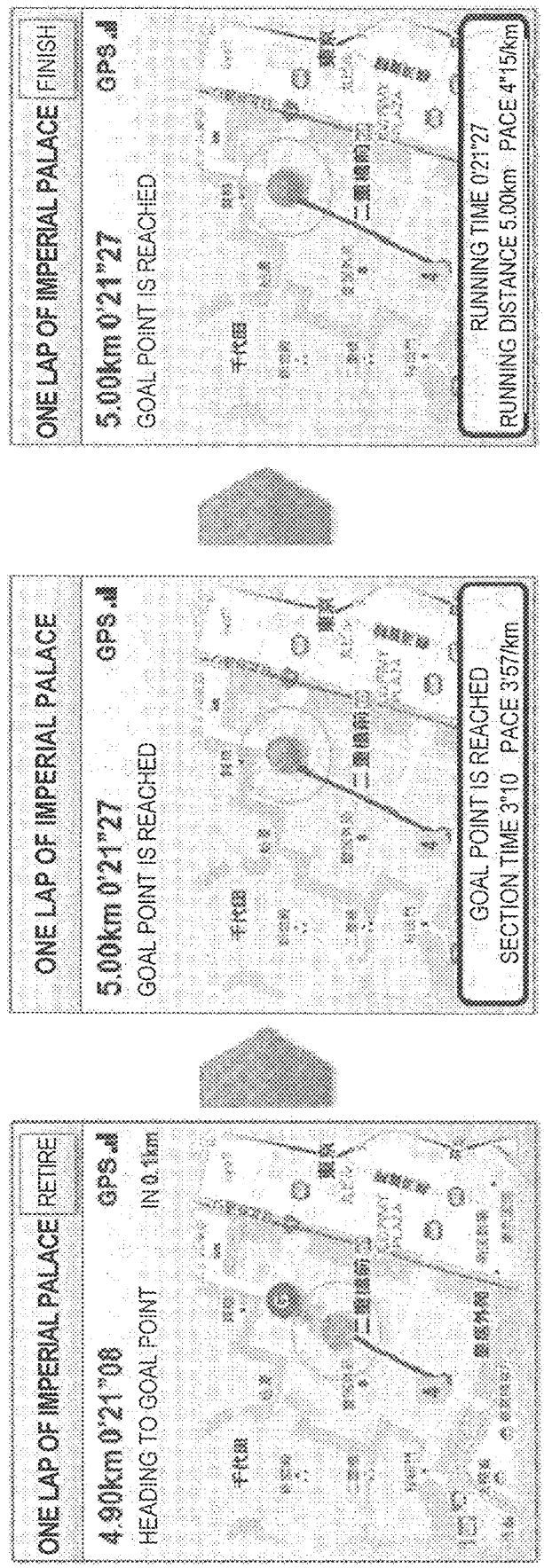
FIG. 11 is a schematic diagram illustrating a transition of a display screen of an LCD of a mobile terminal.

Immediately after a race is started, the mobile terminal 100 displays a first section (including the start point and CP #1) and the present position on a map. Once the present position arrives at CP #1, the guide display discussed above is shown, and then a second section (including CP #1 and CP #2) and the present position is displayed on the map. These are repeated in the same way. Once the present position arrives at the goal point with the final section displayed, a guide is displayed for indicating "that the goal point is reached" and indicating "the running time and running pace in the final section" as illustrated in FIG. 11, and the race is finished. Thereafter, guide display shows "the running time, running distance, and running pace in the whole race" and a "result" button is displayed. Once a user presses the "result" button, the device uploads and stores to and in the measured piece of run data in the server 300 in association with the user ID and the race ID.

Figure 12:
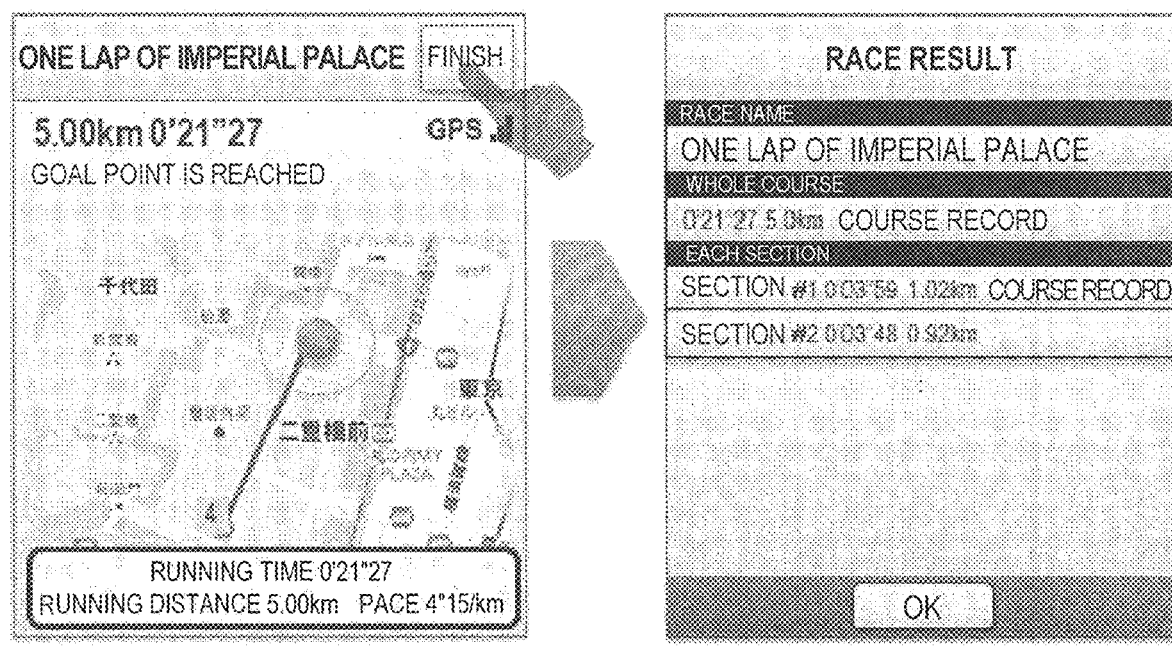
FIG. 12 is a schematic diagram illustrating a transition of a display screen of an LCD of a mobile terminal.

Next, the display of a race result will be described. As illustrated in FIG. 12, the mobile terminal 100 displays the time from the start point to the goal point and the running distance acquired from the piece of run data as a race result. If the result shows that the running time tops the previous course record or the personal best record, it is displayed. The similar result is displayed for each section.

[3. Automatic Check Point Disposing Function]

Next, the automatic check point disposing function will be described. The piece of run data of each user is statistically processed in the present embodiment to estimate a course characteristic such as a sloping road and a street with a large number of traffic lights. The running locus (on a map) acquired from the piece of run data measured by a user is automatically divided in a form meaningful for humans. This allows a course to be divided in a more meaningful method than a method of mechanically dividing a course every 1 km from the start.

FIG. 13 is a schematic diagram for describing an overview of an automatic check point disposing function. As illustrated in FIG. 13, let us assume that there are three pieces of run data of routes A, B, and C as a route from a start spot 1 to a goal spot 2. If a user who creates the piece of run data of the route B attempts to dispose a check point, the route B overlaps with the piece of run data of the route A in a section 1 and overlaps with the piece of run data of the route C in a section 2. Accordingly, it is possible to divide a route at a position or the like at which the speed of a runner considerably changes or the like and to dispose a check point at the optimum position by using even the piece of run data of the route A in the section 1. It is possible in the same way to dispose a check point at the optimum position by using the piece of run data of the route C in the section 2. The more pieces of run data include routes other than the routes A and C which overlap with the route B, the more useful check points can be disposed.

Figure 14C:
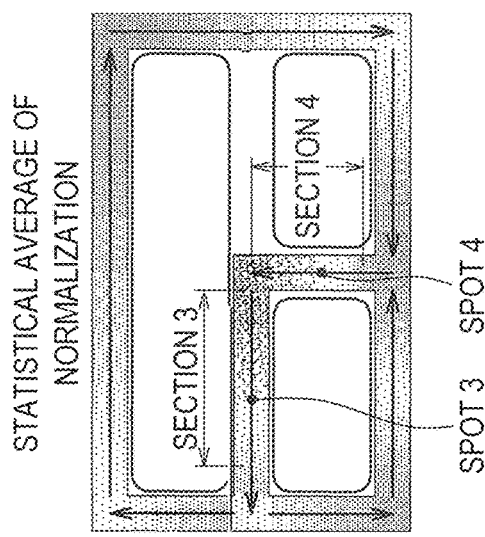
FIGS. 14A, 14B and 14C are schematic diagrams for describing an overview of an automatic check point disposing function.
Figure 14B:
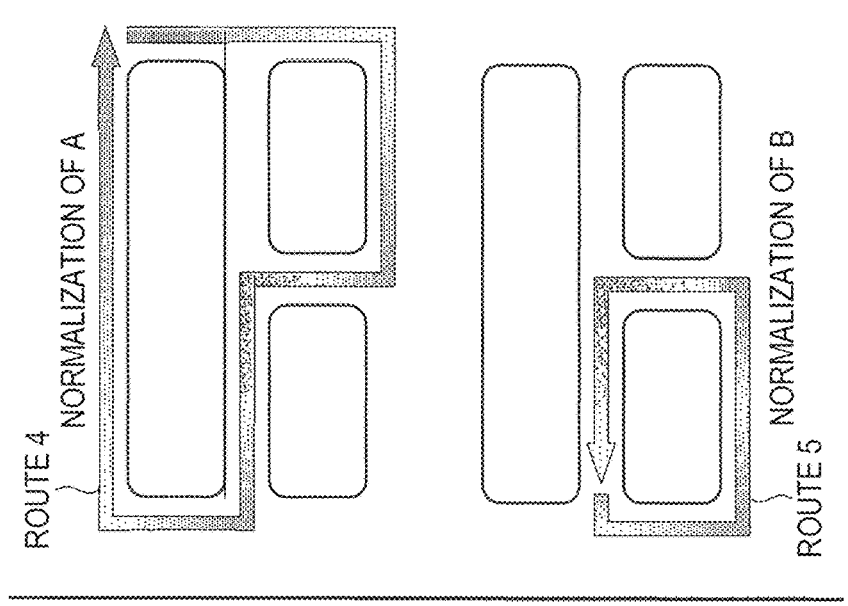
Figure 14A:
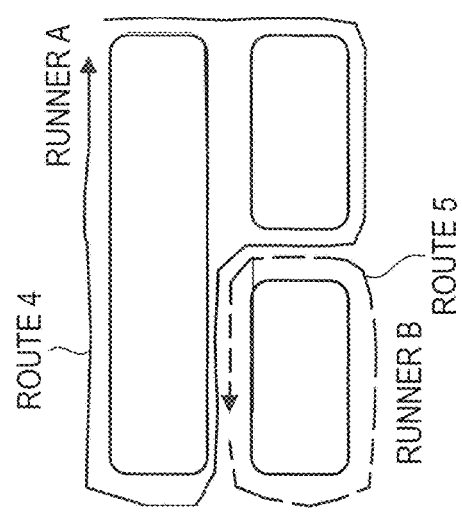

FIG. 14A illustrates that a runner A has the piece of run data of a route 4, and a runner B has the piece of run data of a route 5. In this case, normalized velocity is obtained for the route 4 of the runner A, and normalized velocity is obtained for the route 5 of the runner B as illustrated in FIG. 14B. As illustrated in FIG. 14C, the route 4 of the runner A overlaps with the route 5 of the runner B in sections 3 and 4. It is thus possible to more accurately estimate the situations of the sections 3 and 4 by obtaining the statistical average of the normalized velocities of the runners A and B in the sections 3 and 4. For example, if the statistical average of the normalized velocities from a spot 4 to a spot 3 in the sections 3 and 4 is slower (than in sections therearound), it is possible to divide a piece of run data passing through the sections 3 and 4 at the spots 3 and 4, and to set check points at the spots 3 and 4. This makes it possible to divide a route and set a check point at a position at which a runner experiences a change in the velocity. Additionally, the normalized velocity will be described below in detail.

FIG. 29 illustrates an example in which the section 1 is a flat and the section 2 is an uphill slope as an example. In this case, the middle of a portion where a flat changes into an uphill slope is used as a partition (check point CP) of the section.

Figure 15:
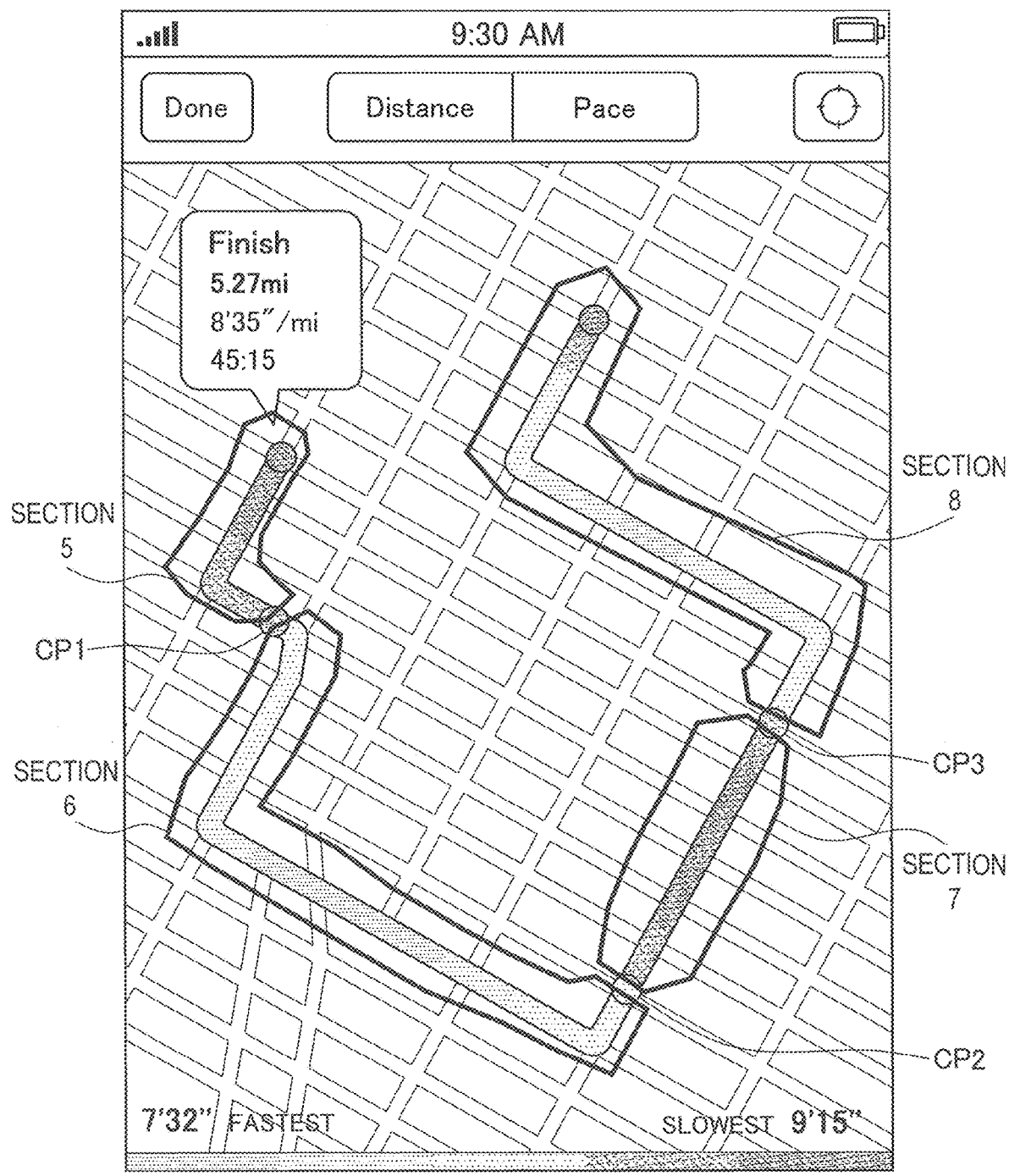
FIG. 15 is a schematic diagram illustrating an example in which a check point is automatically set in a piece of run data.

FIG. 15 is a schematic diagram illustrating an example in which a check point is automatically set in a piece of run data in the above-described way. The example illustrated in FIG. 15 shows an example in which a piece of run data A is divided into four sections 5, 6, 7, and 8 by using another piece of run data, and check points CP1, CP2, and CP 3 are provided. In this way, the use of the automatic check point disposing function allows a check point to be disposed at the optimum position.

The server 300 stores pieces of run data of a plurality of users. A local characteristic of a course is estimated by statistically using these pieces of run data. For example, a pace in a section of a street with a large number of traffic lights is slower than a pace in the whole course. A sloping road leads to different paces even in the same section depending on the traveling direction. An uphill slope leads to a slower pace, while a downhill slope leads to a faster pace. A fast pace and a slow pace are not absolute values. They are relatively compared values obtained by examining a certain piece of run data of a certain user. Accordingly, values obtained by normalizing paces are used for statistically processing all the pieces of run data of all the users. This estimation result is then used to automatically set a check point at a position at which a local characteristic of the course changes. This divides each section of the course in a form meaningful for a user.

As discussed above, a piece of run data is an array of pairs of time and coordinates. A certain piece of run data R is selected, a given element k (k=0, 1, . . . , n−1) in the array is expressed as a pair of time t(k) and coordinates p(k) or {t(k), p(k)}. It is possible to obtain the velocity v(k) of the element k other than the final element k=n−1 from {t(k), p(k)} and the next element {t(k+1), p(k+1)}.

Figure 16:
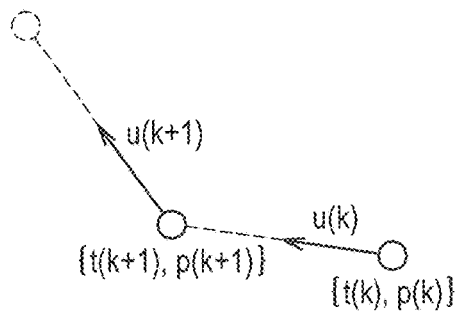
FIG. 16 is a schematic diagram illustrating that normalized velocity of each element is obtained.

The magnitude (speed) of the velocity v(k) is obtained for every element of the piece of run data R, and the average speed $V_{ave}=\Sigma|v(k)|/n$ is computed. The normalized velocity is obtained by normalizing the magnitude of the velocity v(k) in a manner that the magnitude of $V_{ave}$ is 1.0, and the normalized velocity $u(k)=v(k)/V_{ave}$ is obtained for every element of R as illustrated in FIG. 16. In this way, the normalized velocity is obtained for every piece of run data of every user, and a set of pairs {p(i), u(i)} of coordinates p(i) and normalized velocity u(i) is stored in a database 310 (see FIG. 23) of the server. Performing a process on the basis of the normalized velocity in this way makes it possible to obtain suitable velocity in a route from pieces of run data, excluding a factor of a difference in the performance of individual runners.

[4. Specific Example of Process Performed in Server]

Figure 17:
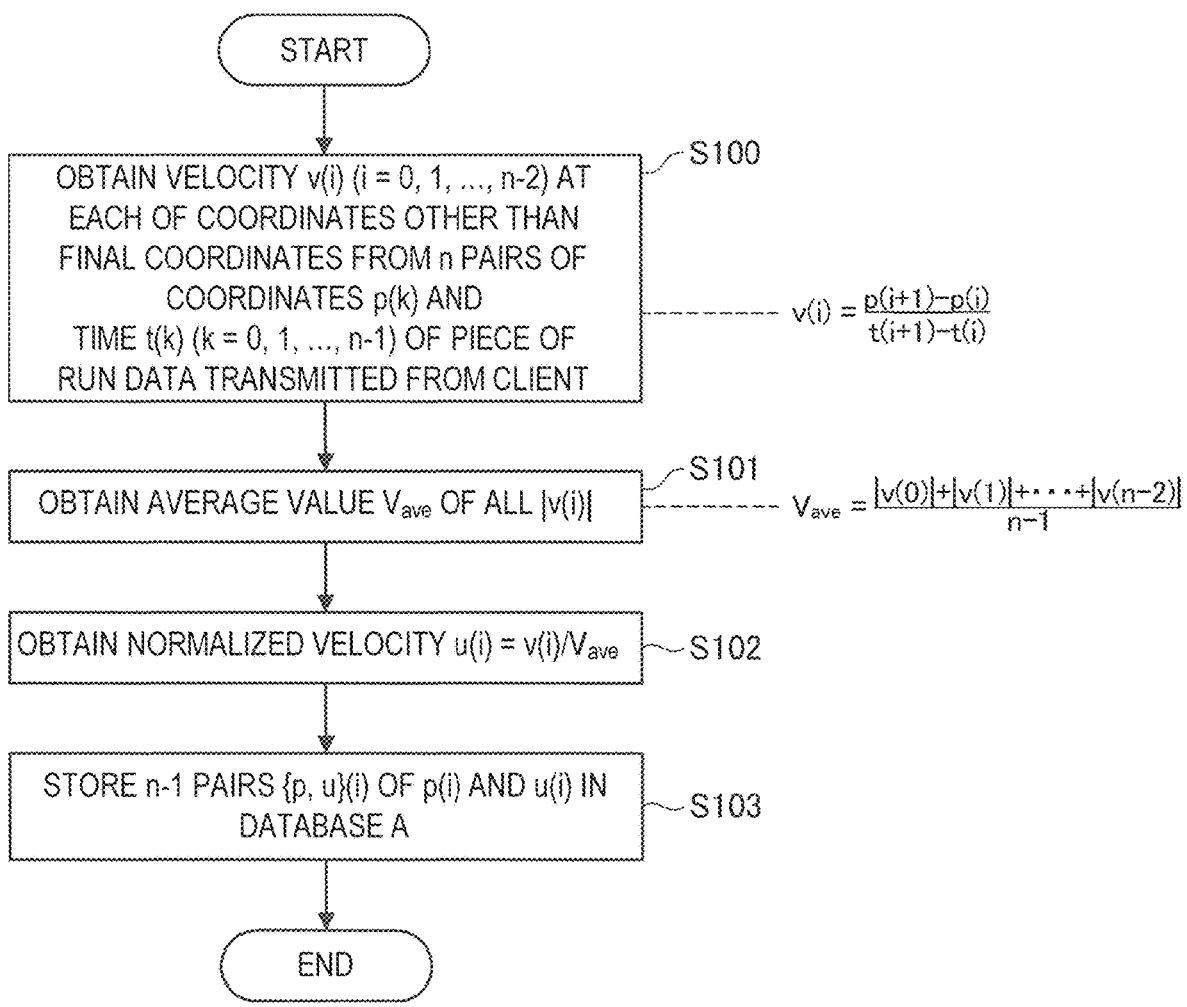
FIG. 17 is a flowchart illustrating a process of obtaining a pair $\{p, u\}(i)$ of $p(i)$ and $u(i)$.

A process performed by the server 300 will be described below on the basis of the flowcharts of FIGS. 17, 19, 20, and 22. FIG. 17 is a flowchart illustrating a process of obtaining a pair {p, u}(i) of p(i) and u(i). A piece of run data is an array having pairs of "time t and coordinates p" arranged in a chronological order as elements as illustrated in FIG. 3. An element {p(k), t(k)} (k=0, 1, . . . , n−1) is described as {p, t}(k) below. First of all, in step S100, velocity v(i) (i=0, 1, . . . , n−2) is obtained for every element other than the final element from the element {p, t}(k) and the next element {p, t}(k+1). Herein, v(i) can be obtained from the following expression.

$$v(i)=(p(i+1)-p(i))/(t(i+1)-t(i))$$

In the next step S101, the average value Vave of the magnitudes |v(i)| of all the velocities v(i) is obtained. Vave can be obtained from the following expression.

$$Vave=(|v(0)|+|v(1)|+ \ldots +|v(n-2)|)/(n-1)$$

Figure 18A:
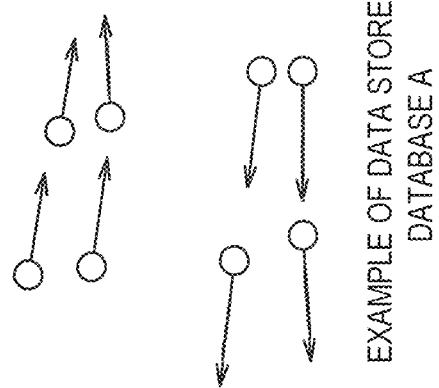
FIGS. 18A, 18B and 18C are schematic diagrams illustrating normalized velocity to be stored in a database.

In the next step S102, normalized velocity u(i)=v(i)/Vave is obtained. At this stage, the normalized velocity of each element other than the final element is obtained as illustrated in FIG. 16. In the next step S103, n−1 pairs {p, u}(i) of p(i) and u(i) are stored in the database 310 of the server. After step S03, the process is terminated. As a result, as illustrated in FIG. 18A, the database 310 stores a set of normalized velocities (represented by the direction and magnitude of an arrow in FIG. 18A) at each of coordinates (represented by ○ in FIG. 18A).

Figure 18B:
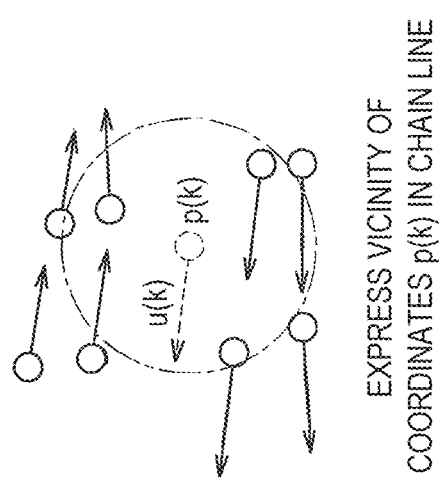
Figure 18C:
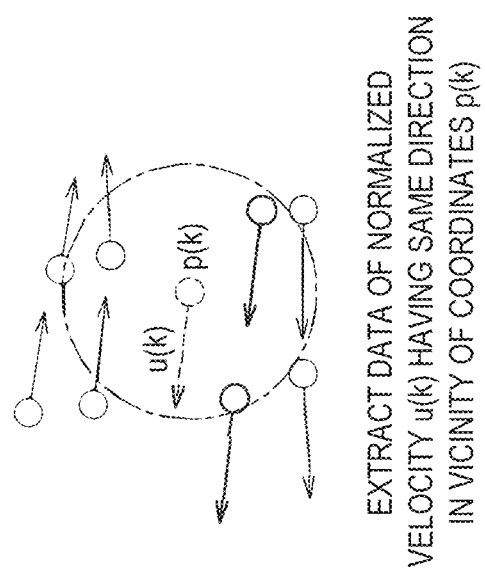

A piece of run data that is a target of the automatic check point disposing function is used as a piece of run data R'. As illustrated in FIG. 18B, a given element k (i.e. {t(k), p(k)}) of R' and u(k) are computed in the above-described method, and a piece of data {p(i), u(i)} of the database 310 in the vicinity of p(k) is extracted. Furthermore, as illustrated in FIG. 18C, a plurality of u(i) having the same direction as that of u(k) in the piece of data {p(i), u(i)} of the database 310 in the vicinity of p(k) are extracted. Comparison of an inner product u(k)·u(i) with a suitable threshold can determine whether or not the directions are the same. The average value of the magnitudes of the extracted normalized velocities u(i) is defined as h(k). This h(k) is referred to as level of the element k of the piece of run data R'. In this way, levels can be obtained from the database 310 for all the elements of the piece of run data R'.

Figure 19:
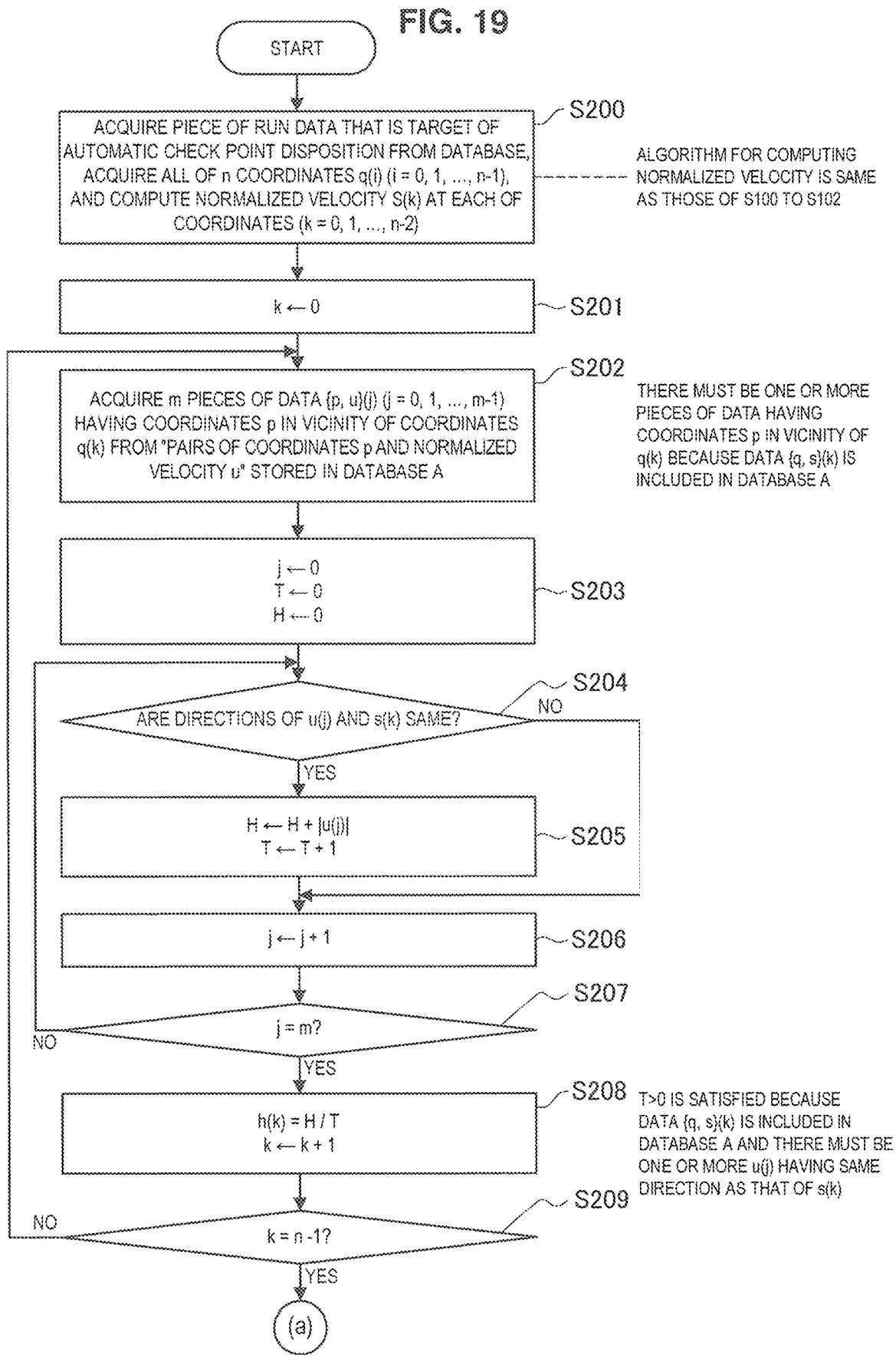
FIG. 19 is a flowchart illustrating a process of obtaining a level of an element k.

A specific description will be made below on the basis of the flowchart of FIG. 19. FIG. 19 is a flowchart illustrating a process of obtaining the level of the element k. As a prerequisite, let us assume that the database 310 of the server 300 stores a result obtained by computing all the pieces of run data of various users. Furthermore, it is assumed that a certain user sets a check point in his or her run data R, and starts to set a race course. In addition, the database 310 has already stored the coordinates and the normalized velocity for that piece of run data R through the processing from S100 to S103.

The "levels" at n coordinates of the piece of run data R are obtained in the processing from steps S200 to S209 (final coordinates are excluded). First of all, in step S200, the normalized velocities s(k) at all the coordinates q(k) (k=0, 1, . . . , n−2) other than the final element are obtained from n pairs {t, q}(i) (i=0, 1, . . . , n−1) of time t and coordinates q included in the piece of run data R. This processing has been described for S100 to S103 of FIG. 17.

In step S201, k is initialized to 0. In step S202, a piece of data {p, u} of the database 310 in the vicinity of the coordinates q(k) are all acquired. It is assumed that there are m pieces of data (m≥1) in the vicinity of q(k), they are expressed as {p, u}(j) (j=0, 1, . . . , m−1). Additionally, the vicinity of the coordinates q(k) refers to a part included in a circle having a predetermined radius from q(k) (the predetermined radius is defined as a threshold indicating the vicinity).

In steps S203 to S207, a piece of data in which the normalized velocity u has the same direction as that of the normalized velocity s(k) obtained in S200 is selected from these m pieces of data {p, u}(j), and the average value h of the magnitudes of their u is obtained. If an angle θ formed by two vectors obtained from the inner product of s(k) and u is less than or equal to a certain threshold, it is determined that the directions are the same.

In step S203, j is initialized to 0. H for obtaining the sum of the magnitudes of u having the same direction as that of s(k) is initialized to 0, and T for counting the number of u having the same direction as that of s(k) is initialized to 0.

In step S204, s(k) and u(j) are compared to determine whether the directions are the same. If so, the process proceeds to step S205. If not, the process proceeds to step S206. In step S205, |u(j)| is added to H, and T is increased by one. In step S206, j is increased by one. The process proceeds to S208 if j and m are equal to each other in step S207, while the process returns to step S204 if j and m are not equal to each other.

In step S208, the value of a level h(k) is initialized with H/T. H/T is the average value of the magnitudes of u(j) having the same direction as that of the normalized velocity s(k). Furthermore, k is increased by one. The process leaves a loop from steps S202 to S208 and proceeds to the processing in step S210 of FIG. 22 if k is equal to n−1 in step S209. If k is not equal to n−1, the process returns to step S202. Additionally, in the processing in these steps S201 to S209, the level h(k) corresponding to all the coordinates q(k) other than the final element of the piece of run data R is obtained.

Figure 21:
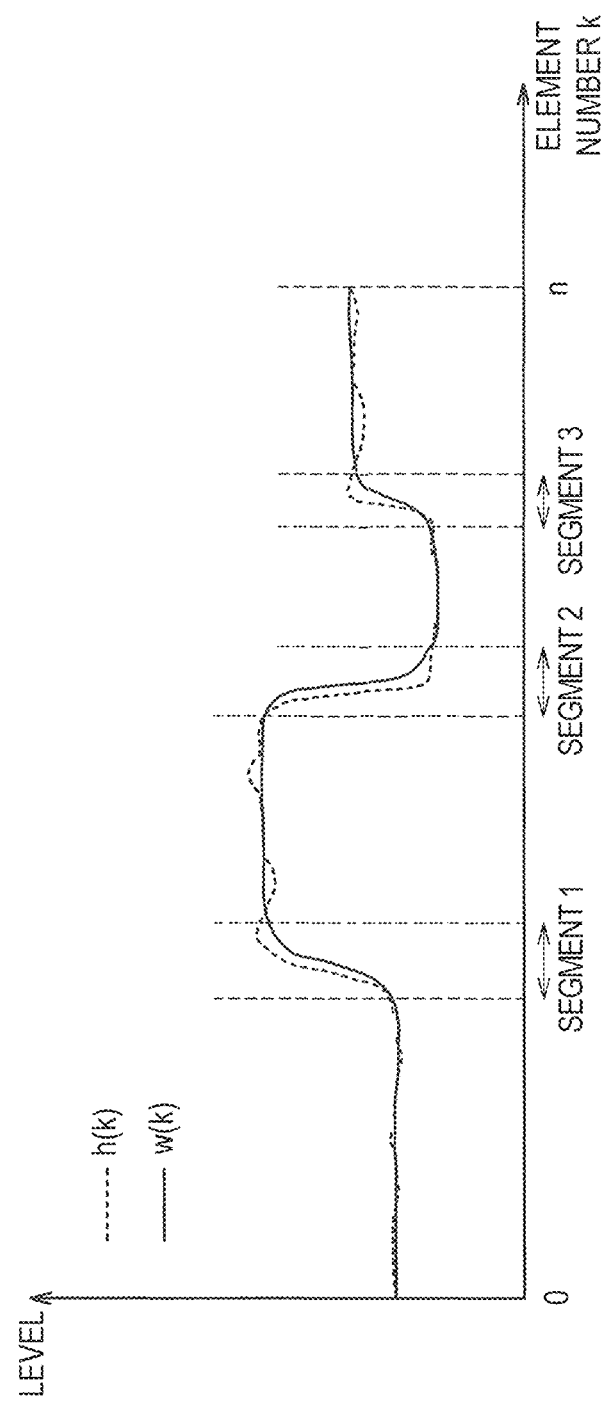
FIG. 21 is a flowchart illustrating a process of obtaining a movement average $w(k)$ of the level $h(k)$ in an order from a first element $k=0$ to a final element of $k=n-1$ of a piece of run data R'.

Next, as illustrated in FIG. 21, a piece of run data is divided on the basis of velocity. Specifically, as illustrated in FIG. 21, the movement average w(k) of the level h(k) is obtained in the order from the first element k=0 to the final element k=n−1 of the piece of run data R'. In this way, the level h(k) fluctuates relatively considerably, so that obtaining the movement average w(k) of the level h(k) can make the level h(k) smooth. A section (segment) of an element is extracted in which w(k) changes (increases or decreases). Additionally, the change in w(k) means that the absolute value |w(k+1)−w(k)| of a difference between the element w(k) and the next element w(k+1) exceeds a suitable threshold. The segment is expressed with a pair {b(j), e(j)} of an element number b(j) at which the change starts, and an element number e(j) at which the change ends.

Figure 20:
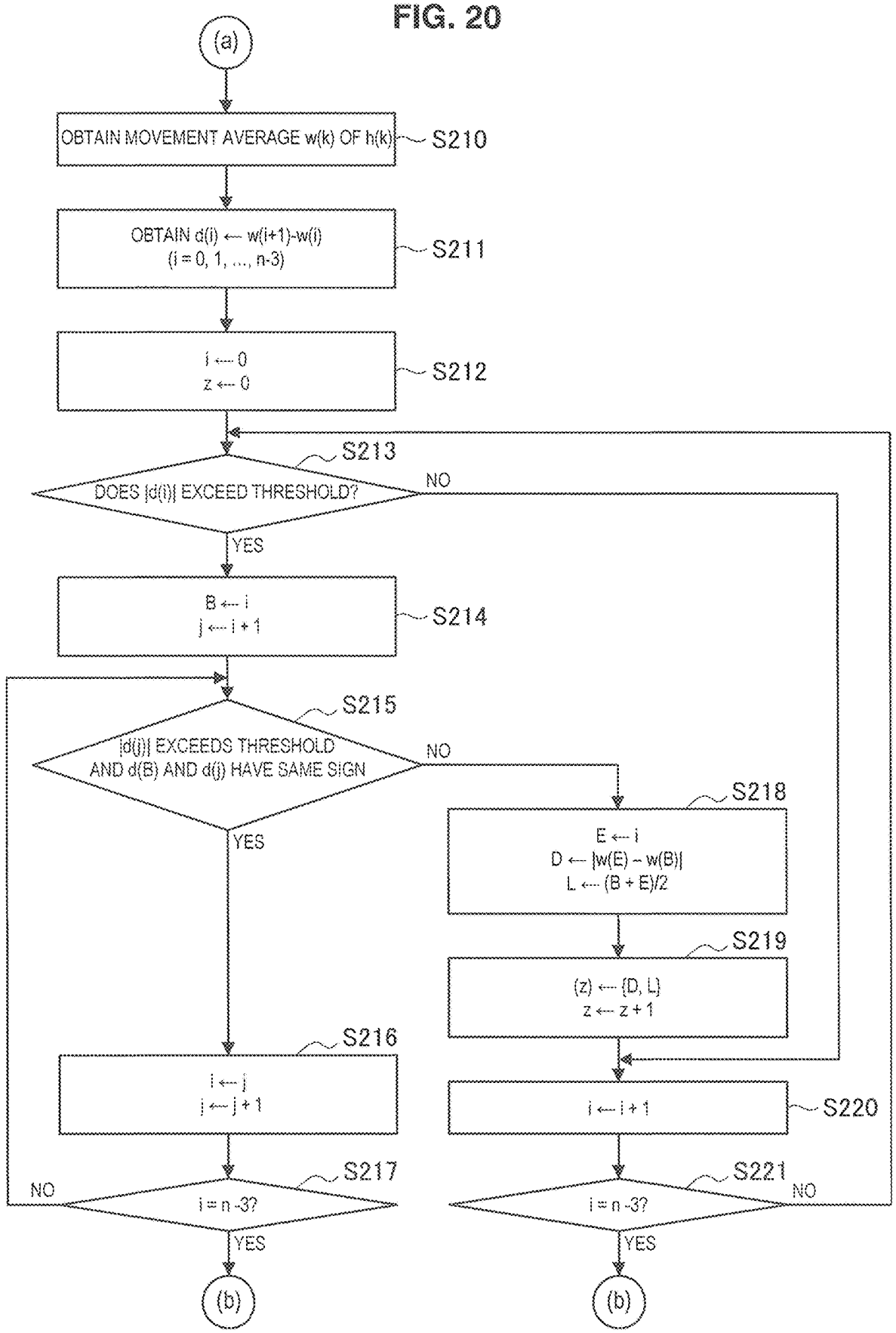
FIG. 20 is a flowchart illustrating a process of obtaining a movement average $w(k)$ of a level $h(k)$ and searching for a section (segment) in which the level considerably changes.

FIG. 20 is a flowchart illustrating a process of obtaining the movement average w(k) of the level h(k) and searching for a section (segment) in which the level considerably changes. An element number B is searched for at which a level difference between neighboring elements exceeds a certain threshold, an element number E is searched for therefrom at which the level difference between the neighboring elements falls below the threshold, and an element number L that is the middle of B and E is obtained. In addition, a difference D between w(B) and w(E) is obtained. Furthermore, the number z of detected pairs S={D, L} of these D and L are counted.

First of all, in step S210, the movement average w(k) of the level h(k) is obtained. In step S211, a level difference (d(i)←w(i+1)−w(i)) between the neighboring w(k) is obtained. In the next step S212, the values of i and z are initialized.

In step S213, it is determined whether or not |d(i)| exceeds a threshold. If |d(i)| exceeds the threshold in step S213, the process proceeds to step S214. If |d(i)| does not exceed the threshold, the process proceeds to step S220. In step S214, i is substituted for the number B of an element that exceeds the threshold (element starts to exceed the threshold). j is then substituted for the element number (i+1) next to i.

If d(j)| exceeds the threshold and d(j) has the same sign as that of d(B) in step S215, the process proceeds to step S216. If |d(j)| does not exceed the threshold or d(j) does not have the same sign as that of d(B), the process proceeds to step S218.

In step S216, j is substituted for i, and j is increased by one. If i is equal to n−3 (i is the final element) in step S217, the process proceeds to step S222 of FIG. 22. If i is not equal to n−3, the process returns to step S215.

In step S218, i is substituted for the number E of the final element successively exceeding the threshold from B. That is to say, it means that the element next to E does not exceed the threshold of step 215. The "absolute value of a difference between the level of E and the level of B" is substituted for D. The "element number that is the middle of B and E" is substituted for L (if it is not possible to divide it by two, round it down to the nearest whole number). In step S219, z-th {D, L} is substituted for S(z) and stored. This makes the section between B and E be a section in which the movement average w(i) is increased (or decreased). It is thus possible to obtain the segments 1, 2, and 3 as illustrated in FIG. 21. Obtaining the element number L that is the middle of B and E makes it possible to detect sections having substantially the constant movement average w(i), and to set a check point at the border between these sections.

In step S220, i is increased by one. If i is equal to n−3 (i is the final element) in step S221, the process proceeds to step S222 of FIG. 22. If i is not equal to n−3, the process returns to step S213.

In the above-described way, the processing from steps S210 to S221 allows z S(i)={D, L}(i) (i=0, 1, . . . , z−1) to be obtained.

Figure 22:
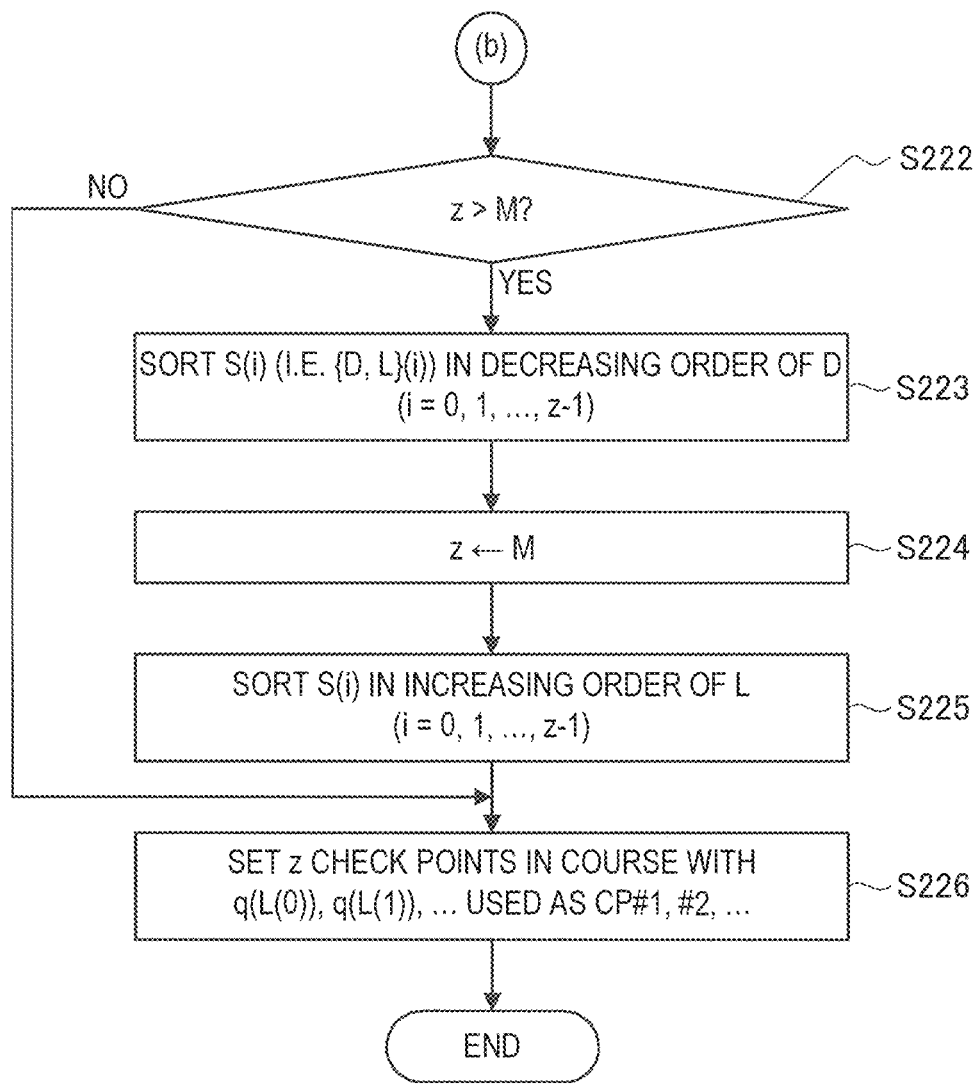
FIG. 22 is a flowchart illustrating a process of disposing a check point for a central element (element number is $(e(i)-b(i))/2$) of each of m segments having a large magnitude of a change among all of segments $\{b(j), e(j)\}$.

Next, on the basis of the flowchart of FIG. 22, the top m segments are further selected from all the segments {b(j), e(j)} in a decreasing order of the magnitude of a change or from the largest |w(e(j))−w(b(j))|. A check point is then disposed for the central element (element number is (e(i)−b(i))/2) of each of these m segments. Referring to the database 310 in this way allows the m check points to be automatically set in the piece of run data R'.

At this stage, element numbers (L(i) (i=0, 1, ..., z−1)) of coordinates that are candidates for check points have been all acquired. However, it is desirable to impose a limitation such as "up to M check points" on the check point automatic disposition. Accordingly, it is determined in step S222 of FIG. 22 whether or not z exceeds M, and if z exceeds M, S(i)={D, L}(i) is rearranged in a decreasing order of the magnitude of D in step S223. The value of z is set as M in step S224, and S(i) is sorted in an increasing order of L (i=0, 1, ..., z−1) in step S225. z check points are set in a course with q(L(0)), q(L(1)), ... used as CP #1, #2, ..., and the top M L(i) are used as check points in step S226. If z is less than or equal to M in step S222, the process proceeds to step S226 and z L(i) continue to be used as check points. As a result, the coordinates q(L(0)), q(L(1)), ... are automatically set as check points #1, #2, ..., respectively.

[5. Example of Configuration of System According to Present Embodiment]

Figure 23:
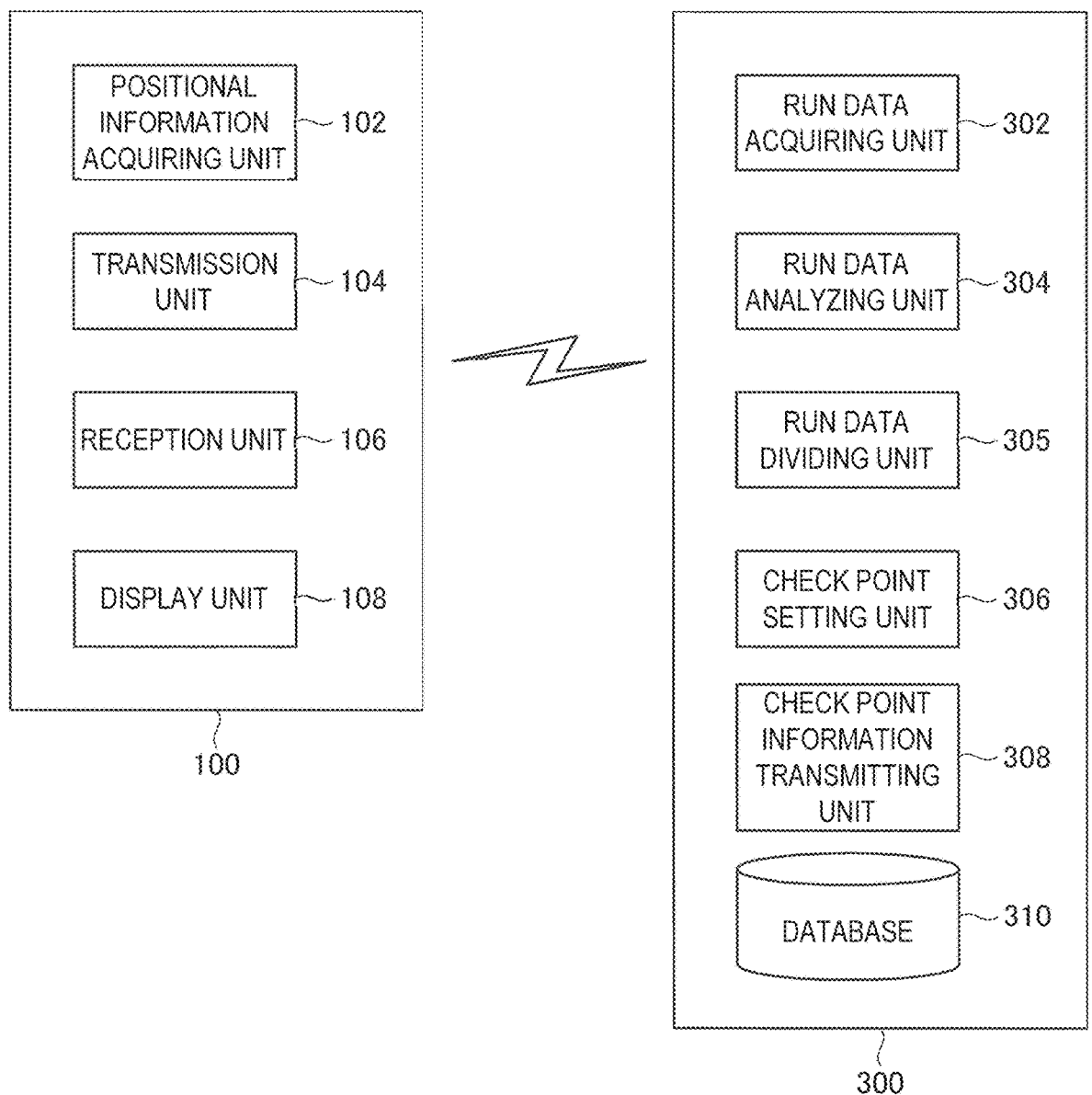
FIG. 23 is a schematic diagram illustrating a system configuration for automatically setting a check point.

FIG. 23 is a schematic diagram illustrating a system configuration for automatically setting a check point. As illustrated in FIG. 23, the mobile terminal 100 includes a positional information acquiring unit (GPS) 102, a transmission unit 104, a reception unit 106, and a display unit (LCD) 108. The positional information acquiring unit 102 acquires positional information for running of a user. The transmission unit 104 transmits a piece of run data including the positional information and the time at which the positional information is acquired to the server 300. The reception unit 106 receives information relating to a check point transmitted from the server 300. The display unit 108 displays a route of the piece of run data on which a check point is overlaid.

In addition, the server 300 includes a run data acquiring unit 302, a run data analyzing unit 304, a run data dividing unit 305, a check point setting unit 306, a check point information transmitting unit 308, and a database 310. The run data acquiring unit 302 acquires a piece of run data from the mobile terminal 100. The run data analyzing unit 304 analyzes velocity for movement on a route of a specific piece of run data on the basis of pieces of run data. The run data dividing unit 305 divides the route of the specific piece of run data on the basis of a result obtained by analyzing the velocity for the movement on the route of the specific piece of run data. The check point setting unit 306 sets a check point for measuring time on the divided route of the piece of run data. The check point information transmitting unit 308 transmits information relating to the set check point.

The personal computer 200 is configured in the same way as the mobile terminal 100. However, the personal computer 200 acquires a piece of run data transmitted from the mobile terminal 100, and transmits the piece of run data to the server 300.

Each structural element of the mobile terminal 100 and the server 300 as illustrated in FIG. 23 can be configured of hardware (circuit) or a central processing device such as a CPU, and software (program) for causing it to function. In this case, the program can be stored in a memory included in the mobile terminal 100 or the server 300, or a recording medium externally connected to the mobile terminal 100 or the server 300.

[6. Example of Setting Check Point Based on Already Set Check Point]

Figure 24:
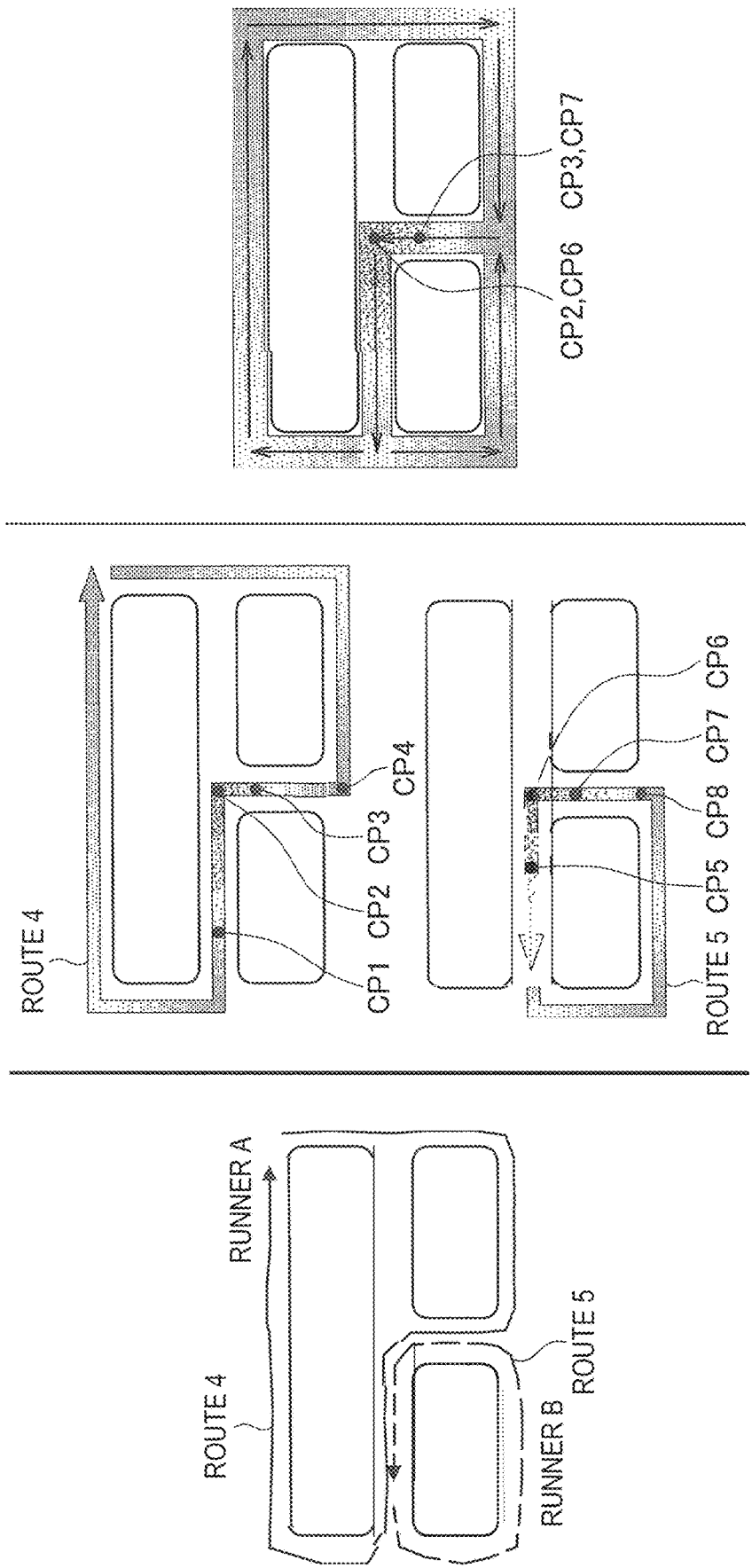
FIG. 24 is a schematic diagram illustrating an example in which a check point is set by using a check point set in another piece of run data.

A check point is set on the basis of the velocity of a piece of run data in the above-described examples, but it is also possible as illustrated in FIG. 24 to use a check point set in another piece of run data to set a check point. As in FIGS. 14A, 14B and 14C, let us assume that routes 4 and 5 have been acquired in the server 300 in FIG. 24. It is assumed that check points CP1 to 4 are set on the route 4, and check points CP5 to 8 are set on the route 5. The check point CP2 of the route 4 is set at substantially the same position as that of the check point CP 6 of the route 5, and the check point CP 3 of the route 4 is set at substantially the same position as that of the check point CP7 of the route 5. It is thus possible to consider that the positions of the check points CP2 and CP 6 are easy to set check points because the positions of the check points CP2 and CP6 are included in a section in which velocity changes or the positions of the check points CP2 and CP6 are close to a landmark place, or because of other factors. Similarly, the positions of the check points CP2 and CP6 are also considered to be easy to set check points. Accordingly, the run data analyzing unit 304 of the server 302 acquires the position of a check point from a piece of run data in which a check point has already been provided. The check point setting unit 306 then sets a check point on a route for which a check point is set at a position at which a check point is frequently set on the basis of the positions of check points set in pieces of run data. This allows a check point to be set at the optimum position on the basis of the positions of check points set in pieces of run data.

Meanwhile, FIG. 25 is a schematic diagram illustrating a technique of estimating the position of a traffic light on the basis of a result obtained by analyzing a piece of run data. As illustrated in FIG. 25, if analysis for pieces of run data A, B, C, and D having the same route shows velocity becomes slow in specific sections D1 and D2, it is estimated that there are traffic lights in the sections D1 and D2. Speaking of the piece of run data A, it can be estimated that a traffic light in the section D1 is at "red" and a traffic light in the section D2 is at "green" when the piece of run data A is acquired. Speaking of the piece of run data B, it can be estimated in the same way that a traffic light in the section D1 is at "green" and a traffic light in the section D2 is at "red" when the piece of run data B is acquired. Meanwhile, it can be estimated that both of the traffic lights in the sections D1 and D2 are at "green" when the piece of run data C is acquired, while both of the traffic lights in the sections D1 and D2 are at "red" when the piece of run data D is acquired. In this way, it is possible to determine whether or not there is a traffic light in a given section on the basis of a piece of run data. It is thus possible to set check points in (at both ends of) a section having a traffic light and to perform the optimum process such as excluding that section from a race result.

There is no constraint on a course between check points, so that it is possible to find out a route allowing a user to run between the check points in the shortest time in a folksonomy fashion. For example, if check points are set at the start spot 1 and the goal spot 2 alone in FIGS. 14A, 14B and 14C, the check points are disposed in a manner that whichever course a user runs on brings about substantially the same result. This can increase the flexibility of a route for running. A strictly fixed course disables users from racing if even a single road is closed owing to road construction or the like, but increased flexibility of a course allows users to enjoy the created race for a long time.

According to the present embodiment as described above, it is possible to divide, as a border, a route at a position at which velocity changes on the route because the route is analyzed on the basis of pieces of run data. This makes it possible to divide a route at a position meaningful for running users, and to dispose a check point at the optimum position. This makes users recognize results of running on the basis of check points, thereby making training effects of running more explicit. This provides new user experience such as improved motivation through races with other users.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

Additionally, the present technology may also be configured as below.

(1)
An information processing device including:
a movement data acquiring unit configured to acquire pieces of movement data including positional information for movement and time at which the positional information is acquired;
a movement data analyzing unit configured to analyze a velocity for movement on a specific route on the basis of the pieces of movement data; and
a route dividing unit configured to divide the specific route on the basis of a result obtained by analyzing the velocity.

(2)
The information processing device according to (1), further including:
a check point setting unit configured to set a check point for measuring time on the divided specific route.

(3)
The information processing device according to (1),
wherein the movement data analyzing unit analyzes the velocity for the movement on the specific route for each of the pieces of movement data on the basis of a result obtained by analyzing a plurality of normalized velocities obtained by dividing each of velocities acquired at a plurality of positions by velocities in all of sections.

(4)
The information processing device according to (3),
wherein the movement data analyzing unit analyzes a velocity for movement at a given position on the specific route on the basis of the normalized velocity acquired at a position adjacent to the given position on the specific route.

(5)
The information processing device according to (4),
wherein the movement data analyzing unit analyzes a velocity for movement at a given position on the specific route on the basis of the normalized velocity having a same direction as a direction of a velocity at the given position on the specific route.

(6)
The information processing device according to (4),
wherein the route dividing unit divides the specific route on the basis of a change in the velocity for the movement at the given position on the specific route, and
wherein the check point setting unit sets the check point in each of sections obtained through division.

(7)
The information processing device according to (4),
wherein the route dividing unit divides the specific route on the basis of a movement average of the velocity for the movement at the given position on the specific route, and
wherein the check point setting unit sets the check point in each of sections obtained through division.

(8)
The information processing device according to (6) or (7),
wherein the check point setting unit sets the check point at an intermediate position of each of the sections obtained through the division.

(9)
The information processing device according to (7),
wherein the check point setting unit selects one or more sections each having a movement average considerably changing from each of the sections obtained through the division, and sets the check point in the each of the selected sections.

(10)
An information processing device including:
a positional information acquiring unit configured to acquire positional information for movement;
a transmission unit configured to transmit movement data to a server, the movement data including the positional information and time at which the positional information is acquired; and
a reception unit configured to receive information relating to a check point set on a route of the movement data,
wherein the information relating to the check point is set by the server analyzing a velocity for movement on the route of the movement data on the basis of pieces of the movement data received from a different device.

(11)
An information processing system including:
an information processing device including
 a movement data acquiring unit configured to acquire pieces of movement data including positional information for movement and time at which the positional information is acquired,
 a movement data analyzing unit configured to analyze a velocity for movement on a specific route on the basis of the pieces of movement data,
 a route dividing unit configured to divide the specific route on the basis of a result obtained by analyzing the velocity;
 a check point setting unit configured to set a check point for measuring time on the divided specific route, and
 a transmission unit configured to transmit information on the check point; and
a mobile device including
 a positional information acquiring unit configured to acquire positional information for movement,
 a transmission unit configured to transmit movement data to the information processing device, the movement data including the positional information and time at which the positional information is acquired, and
 a reception unit configured to receive the information on the check point transmitted by the information processing device.

(12)
An information processing method including:
acquiring pieces of movement data including positional information for movement and time at which the positional information is acquired;
analyzing a velocity for movement on a specific route on the basis of the pieces of movement data; and
dividing the specific route on the basis of a result obtained by analyzing the velocity.

(13)
An information processing method including:
acquiring positional information for movement;
transmitting movement data to a server, the movement data including the positional information and time at which the positional information is acquired; and receiving information relating to a check point set on a route of the movement data, wherein the information relating to the check point is set by the server analyzing a velocity for movement on the route of the movement data on the basis of pieces of the movement data received from a different device.

REFERENCE SIGNS LIST 100 mobile terminal
102 positional information acquiring unit
104 transmission unit
106 reception unit
300 server
302 run data acquiring unit
304 run data analyzing unit
305 run data dividing unit
306 check point setting unit
308 check point information transmitting unit
310 database

What is claimed is:

1. An information processing apparatus, comprising:
a central processing unit (CPU) configured to:
acquire a plurality of pieces of data including positional information for a user movement, wherein the user movement corresponds to a user running state;
set a check point of a route based on:
the acquired plurality of pieces of data, and
at least one of an automatic setting mode or a manual mode; and
control a display screen to display the set check point on a map.

2. The information processing apparatus according to claim 1, wherein the check point is set by the manual mode.

3. The information processing apparatus according to claim 1, wherein the CPU is further configured to set the automatic setting mode based on a velocity of the user movement on the route.

4. The information processing apparatus according to claim 3, wherein the CPU is further configured to analyse, the velocity for the user movement on the route, based on the acquired plurality of pieces of data.

5. The information processing apparatus according to claim 3, wherein the CPU is further configured to divide the route based on an average of the velocity for the user movement at a specific position on the route.

6. The information processing apparatus according to claim 4, wherein
the CPU is further configured to divide the route based on a change in the velocity for the user movement, and
the change in the velocity is at a specific position on the route.

7. A method, comprising:
acquiring a plurality of pieces of data including positional information for a user movement, wherein the user movement corresponds to a user running state;
setting a check point of a route based on:
the acquired plurality of pieces of data; and
at least one of an automatic setting mode or a manual mode; and
controlling a display screen to display the set check point on a map.

8. A non-transitory computer-readable medium having stored thereon, computer-executable instructions that, when executed by a computer, cause the computer to execute operations, the operations comprising:
acquiring a plurality of pieces of data including positional information for a user movement, wherein the user movement corresponds to a user running state;
setting a check point of a route based on:
the acquired plurality of pieces of data; and
at least one of an automatic setting mode or a manual mode; and
controlling a display screen to display the set check point on a map.

9. The information processing apparatus according to claim 1, wherein the CPU is further configured to control the display screen to display the route on the map.

10. The information processing apparatus according to claim 1, wherein
the CPU is further configured to control the display screen to display a plurality of check points of the route, and
the route between the plurality of check points is represented by at least one of a color, a pattern, or darkness.

11. The information processing apparatus according to claim 10, wherein
the CPU is further configured to divide the route into a plurality of sections of the route based on the plurality of check points, and
the plurality of sections of the route is represented by the at least one of the color, the pattern, or the darkness.

* * * * *